United States Patent
Takeda et al.

(10) Patent No.: US 9,955,437 B2
(45) Date of Patent: Apr. 24, 2018

(54) USER TERMINAL, RADIO COMMUNICATION METHOD AND RADIO COMMUNICATION SYSTEM

(71) Applicant: NTT DOCOMO, INC., Tokyo (JP)

(72) Inventors: Kazuki Takeda, Tokyo (JP); Hideaki Takahashi, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/513,805

(22) PCT Filed: Sep. 25, 2015

(86) PCT No.: PCT/JP2015/077049
§ 371 (c)(1),
(2) Date: Mar. 23, 2017

(87) PCT Pub. No.: WO2016/047731
PCT Pub. Date: Mar. 31, 2016

(65) Prior Publication Data
US 2017/0303212 A1  Oct. 19, 2017

(30) Foreign Application Priority Data
Sep. 25, 2014  (JP) .................. 2014-195459

(51) Int. Cl.
*H04W 52/32* (2009.01)
*H04W 52/36* (2009.01)
*H04W 52/48* (2009.01)

(52) U.S. Cl.
CPC ......... *H04W 52/325* (2013.01); *H04W 52/36* (2013.01); *H04W 52/48* (2013.01)

(58) Field of Classification Search
CPC ........... H04W 72/042; H04W 72/0406; H04W 52/18; H04W 74/006; H04W 52/325; H04W 52/04; H04W 52/367; H04W 52/48
(Continued)

(56) References Cited

U.S. PATENT DOCUMENTS

2013/0188580 A1* 7/2013 Dinan ................. H04W 52/281
370/329

OTHER PUBLICATIONS

International Search Report issued in PCT/JP2015/077049 dated Dec. 15, 2015 (1 page).
(Continued)

*Primary Examiner* — Keith Ferguson
(74) *Attorney, Agent, or Firm* — Osha Liang LLP

(57) ABSTRACT

A user terminal that communicates using a plurality of CGs (Cell Groups) including a first CG and a second CG, includes a PHY layer processing section that controls transmission power of a PRACH (Physical Random Access Channel) in each CG; and a MAC layer processing section that controls retransmission of the PRACH. When total transmission power of PRACHs of the plurality of CGs that are transmitted in an overlapping manner exceeds allowable maximum transmission power, the PHY layer processing section controls so as to preferentially allocate transmission power to the PRACH of the first CG, and based on notification which is reported from the PHY layer processing section when total transmission power of PRACHs of the plurality of CGs that are transmitted in an overlapping manner exceeds allowable maximum transmission power, the MAC layer processing section controls power-ramping in retransmission of the PRACH of the second CG.

14 Claims, 18 Drawing Sheets

(58) Field of Classification Search
USPC ......... 455/522, 69, 433, 445, 500, 517, 515,
455/507, 68, 127.1–127.3, 422.1, 403,
455/450, 509, 550.1, 426.1, 426.2, 67.11,
455/73; 370/328, 329, 336, 310, 338,
370/236
See application file for complete search history.

(56) References Cited

OTHER PUBLICATIONS

Written Opinion of the International Searching Authority issued in PCT/JP2015/077049 dated Dec. 15, 2015 (3 pages).
3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).

\* cited by examiner

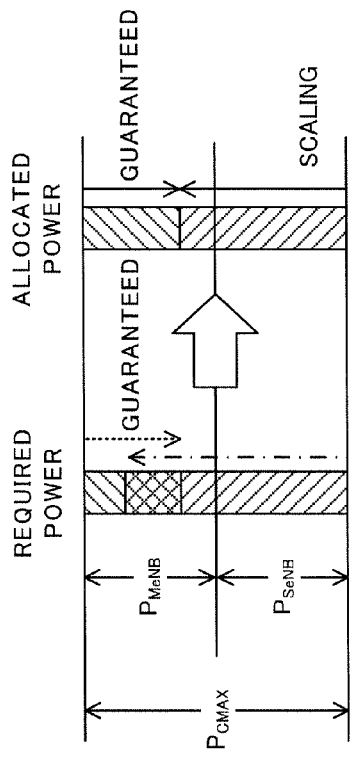
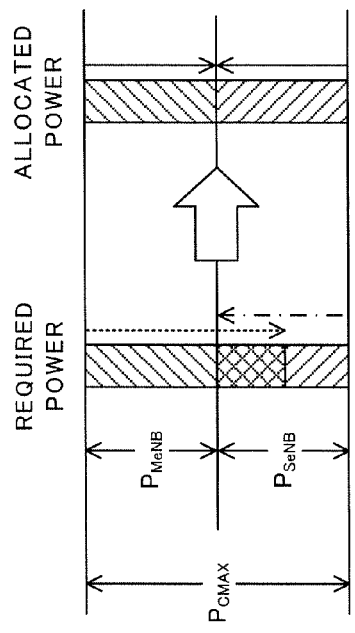
FIG.4A
FIG.4B

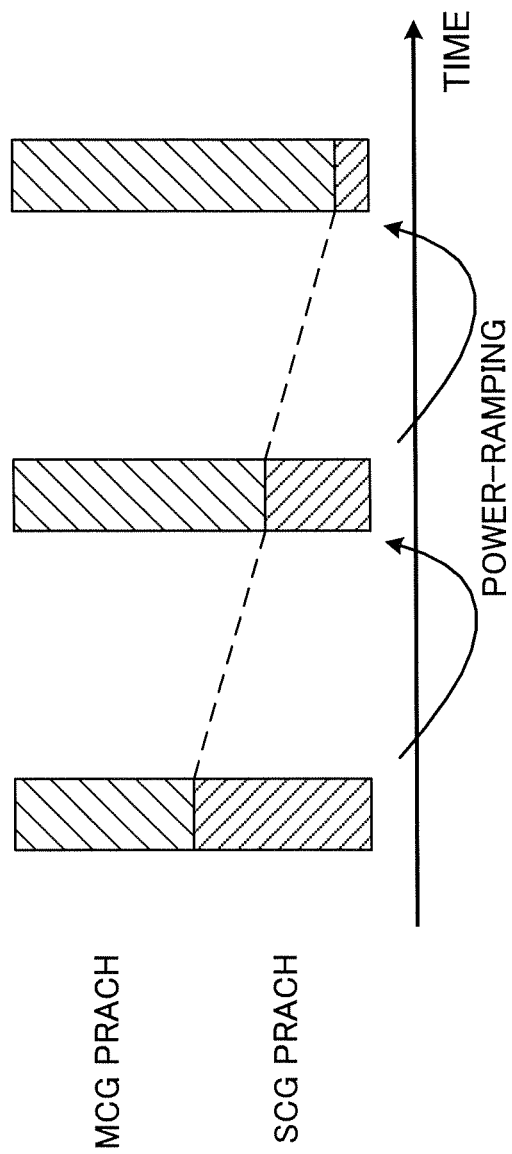

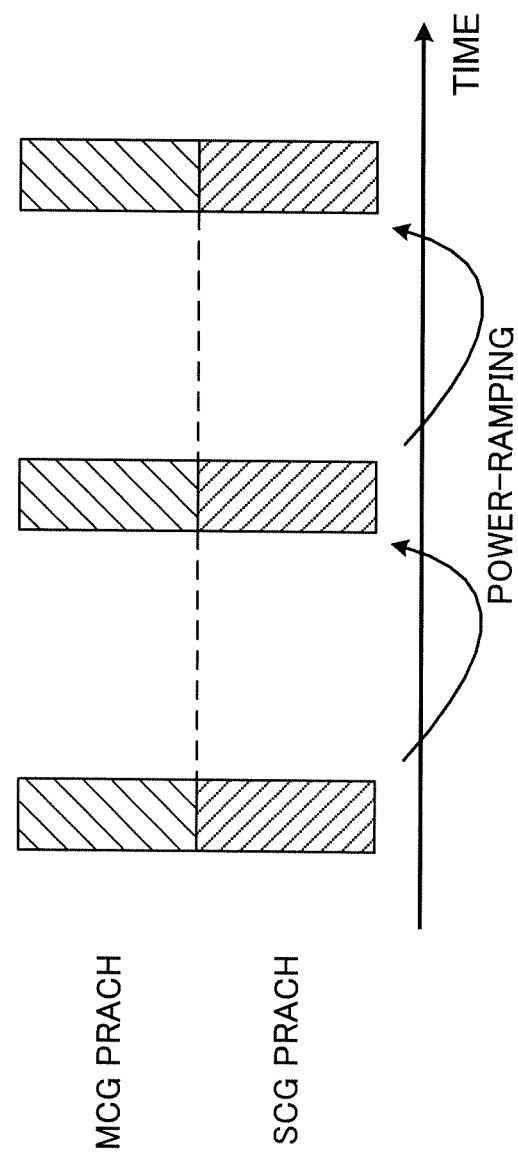

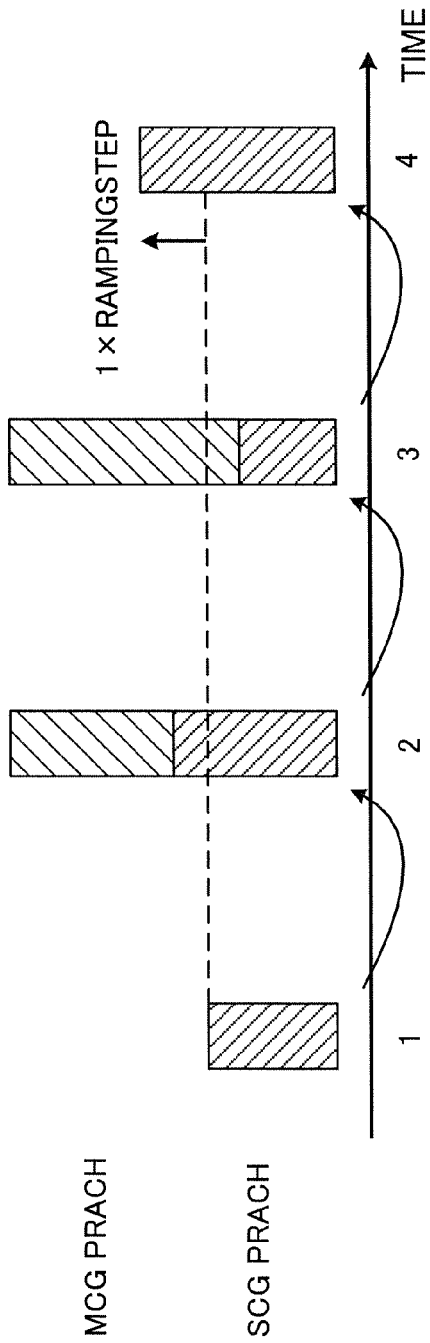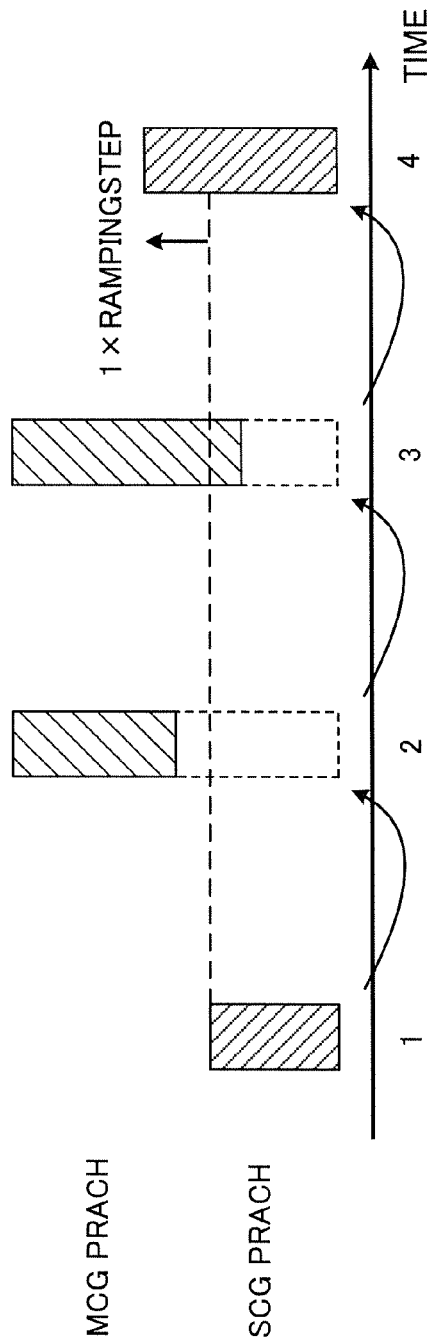

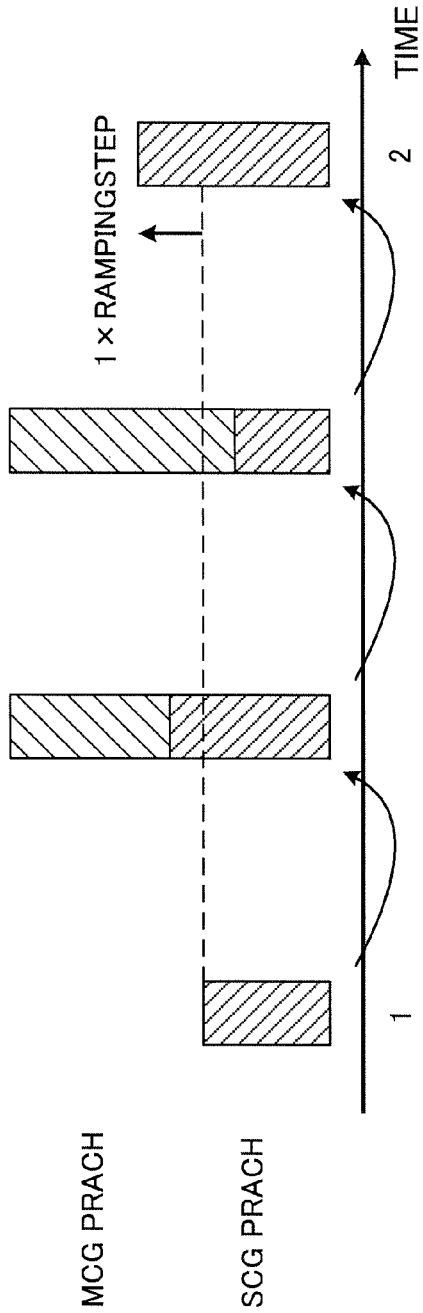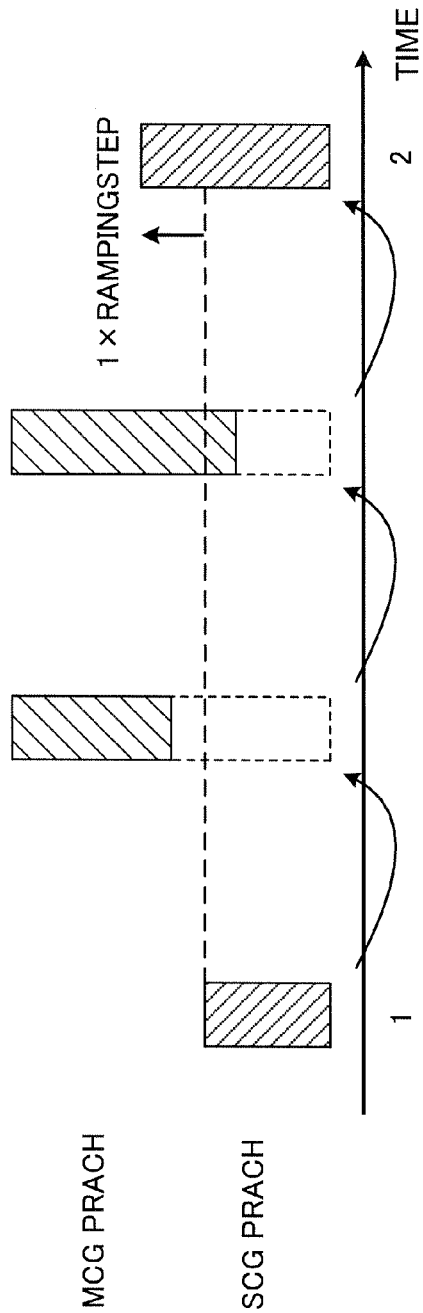

USER TERMINAL, RADIO COMMUNICATION METHOD AND RADIO COMMUNICATION SYSTEM

TECHNICAL FIELD

The present invention relates to a user terminal, radio communication method and radio communication system in the next-generation mobile communication system.

BACKGROUND ART

In UMTS (Universal Mobile Telecommunications System) networks, for the purpose of higher data rates, low delay and the like, Long Term Evolution (LTE) has been specified (Non-Patent Literature 1).

In LTE, as multiple access schemes, a scheme based on OFDMA (Orthogonal Frequency Division Multiple Access) is used on downlink, and a scheme based on SC-FDMA (Single Carrier Frequency Division Multiple Access) is used on uplink.

Further, for the purpose of wider bands and higher speed than LTE, for example, a successor system called LTE Advanced or LTE Enhancement (also called LTE-A) to LTE has been studied and specified as LTE Rel-10/11. A system band in Rel-10/11 includes at least one component carrier (CC) with a system band of the LTE system as one unit. It refers to carrier aggregation (CA) thus aggregating a plurality of CCs to widen the band.

In LTE Rel-12 that is a further successor system to LTE, various scenarios are studied where a plurality of cells is used in different frequency bands (carriers). In the case where radio base stations for forming a plurality of cells are substantially the same, it is possible to apply the above-mentioned CA. On the other hand, when radio base stations for forming respective cells are completely different from one another, it is studied applying dual connectivity (DC).

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

In the LTE system, importance is high on the physical random access channel (PRACH: Physical Random Access Channel) used in initial connection, synchronization establishment, communication resume and the like. In the case of non-dual connectivity, two or more PRACHs are not simultaneously transmitted, and the highest priority is assigned to power allocation of the PRACH.

However, in a radio communication system using dual connectivity, there is a case that a plurality of PRACHs is simultaneously transmitted. Therefore, when transmission power of each PRACH is not set properly, there is the risk that system throughput deteriorates.

The present invention was made in view of such a respect, and it is an object of the invention to provide a user terminal, radio communication method and radio communication system for enabling decrease in throughput of a system to be suppressed in the radio communication system using dual connectivity.

Solution to Problem

A user terminal according to one aspect of the present invention is a user terminal that communicates using a plurality of CGs including a first cell group (CG) and a second CG, and is characterized by having a PHY layer processing section that controls transmission power of a PRACH (Physical Random Access Channel) in each CG, and a MAC layer processing section that controls retransmission of the PRACH, where when total transmission power of PRACHs of the plurality of CGs that are transmitted in an overlapping manner exceeds allowable maximum transmission power, the PHY layer processing section controls so as to preferentially allocate transmission power to the PRACHs of the first CG, and based on notification which is reported from the PHY layer processing section when total transmission power of PRACHs of the plurality of CGs that are transmitted in an overlapping manner exceeds allowable maximum transmission power, the MAC layer processing section controls power-ramping in retransmission of the PRACH of the second CG.

Advantageous Effects of Invention

According to one aspect of the present invention, in a radio communication system using dual connectivity, it is possible to suppress decrease in throughput of the system.

BRIEF DESCRIPTION OF DRAWINGS

FIG. 4 contains diagrams to explain transmit power control of dual connectivity;

FIG. 5 is a diagram to explain one example of power-ramping of PRACH in Embodiment 1;

FIG. 6 is a diagram to explain one example power-ramping of PRACH in Embodiment 2;

FIG. 9 contains diagrams showing one example in the case of calculating a ramp-up amount with equation 3 in Embodiments 1 and 3;

FIG. 10 contains diagrams showing one example in the case of calculating a ramp-up amount with Modification of equation 3 in Embodiments 1 and 3;

DESCRIPTION OF EMBODIMENTS

In the LTE system, in initial connection, synchronization establishment, communication resume and the like, random access is performed by transmitting a physical random access channel (PRACH) on uplink. The random access is divided into two types i.e. contention-based random access (CBRA) and non-contention-based random access (Non-CBRA). In addition, the non-contention-based RA may be called contention-free RA (CFRA).

In the contention-based random access, a user terminal transmits, on the PRACH, a preamble which is randomly selected from among a plurality of random access preambles (contention preamble) prepared in a cell. In this case, when user terminals use the same random access preamble, there is a possibility that contention occurs.

In the non-contention-based random access, a user terminal transmits a UE-specific random access preamble (dedicated preamble) beforehand assigned from the network on the PRACH. In this case, since different random access preambles are assigned to user terminals, contention does not occur.

The contention-based random access is performed in initial connection, communication start or resume of uplink, and the like. The non-contention-based random access is performed in handover, communication start or resume of downlink, and the like.

Figure 1:
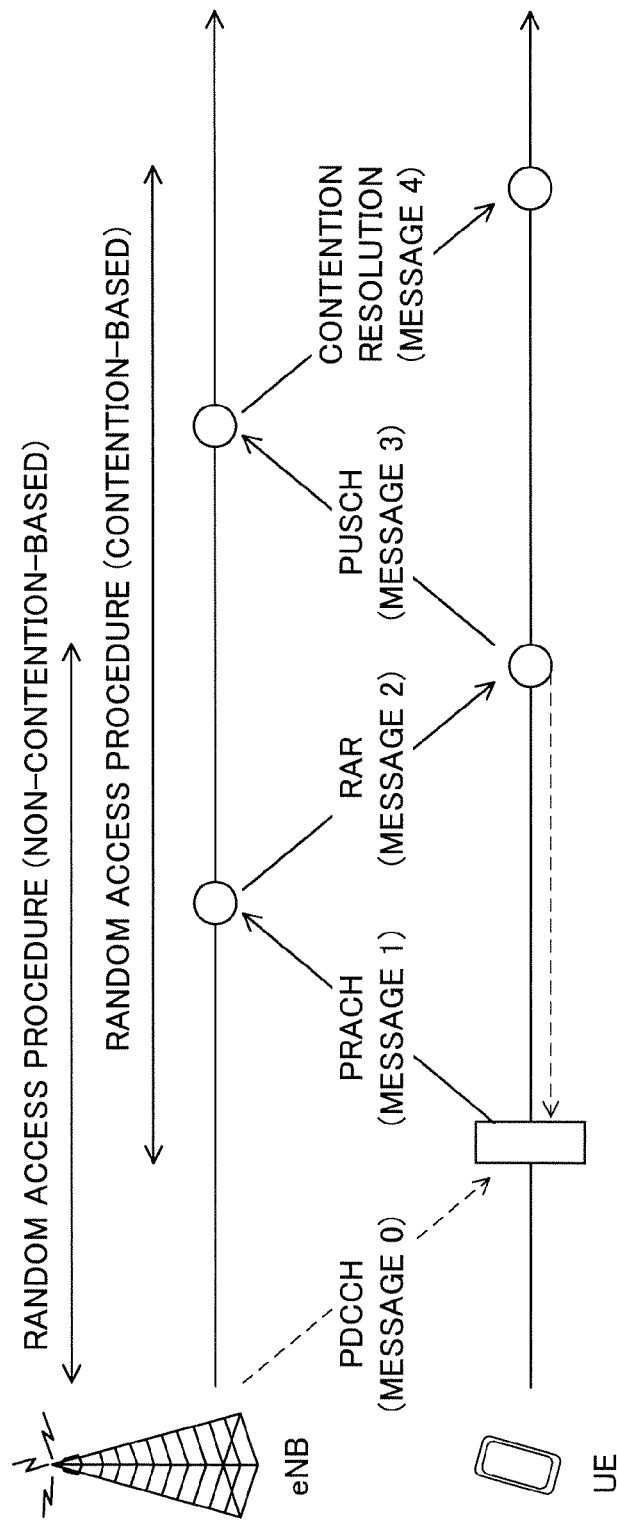
FIG. 1 is a diagram illustrating the general outlines of random access.

FIG. 1 illustrates the general outlines of random access. The contention-based random access is comprised of Steps 1 to 4, and the non-contention-based random access is comprised of Steps 0 to 2.

In the case of the contention-based random access, a user terminal UE first transmits a random access preamble (PRACH) with a PRACH resource set on the cell (Message (Msg: Message) 1). Upon detecting the random access preamble, the radio base station eNB transmits a random access response (RAR) as a response (Message 2). After transmitting the random access preamble, for a predetermined period, the user terminal UE attempts to receive Message 2. When the terminal fails to receive Message 2, the terminal increases transmission power of the PRACH to transmit Message 1 again (retransmission). In addition, increasing transmission power in retransmission of a signal is also referred to as power-ramping. In addition, the user terminal UE compares transmission power obtained by performing power-ramping with maximum transmission power $P_{CMAX,c}$ of the serving cell c to transmit the PRACH, and transmits the PRACH with lower transmission power between two types of transmission power. Accordingly, even by applying power-ramping, transmission power does not exceed $P_{CMAX,c}$.

The user terminal UE receiving the random access response transmits a data signal on a Physical Uplink Shared Channel (PUSCH) designated by an uplink grant included in the random access response (Message 3). The radio base station eNB receiving Message 3 transmits a contention resolution message to the user terminal UE (Message 4). The user terminal UE acquires synchronization by Messages 1 to 4, and when the terminal identifies the radio base station eNB, completes the contention-based random access processing to establish connection.

In the case of the non-contention-based random access, a radio base station eNB first transmits a Physical Downlink Control Channel (PDCCH) for instructing a user terminal UE to transmit a PRACH (Message 0). The user terminal UE transmits a random access preamble (PRACH) at timing indicated by the PDCCH (Message 1). Upon detecting the random access preamble, the radio base station eNB transmits a random access response (RAR) that is response information thereto (Message 2). The user terminal receives Message 2, and thereby completes the non-contention-based random access processing. In addition, as the contention-based random access, when the terminal fails to receive Message 2, the terminal increases transmission power of the PRACH to transmit Message 1 again.

In addition, transmission of the random access preamble (Message 1) using the PRACH is also referred to as transmission of PRACH, and reception of the random access response (Message 2) using the PRACH is also referred to as reception of PRACH.

In addition, in the LTE-A system, HetNet (Heterogeneous Network) is studied where a small cell having a local coverage area with a radius of about several tens of meters is formed in a macro cell having a coverage area of a wide range with a radius of about several kilometers. In the HetNet configuration, it is possible to apply carrier aggregation and dual connectivity.

FIG. 2 contains diagrams showing one example of cell configurations in carrier aggregation and dual connectivity. In FIG. 2, a UE connects to five cells (C1-C5). C1 is a PCell (Primary Cell), and C2 to C5 are SCells (Secondary Cells).

Figure 2A:
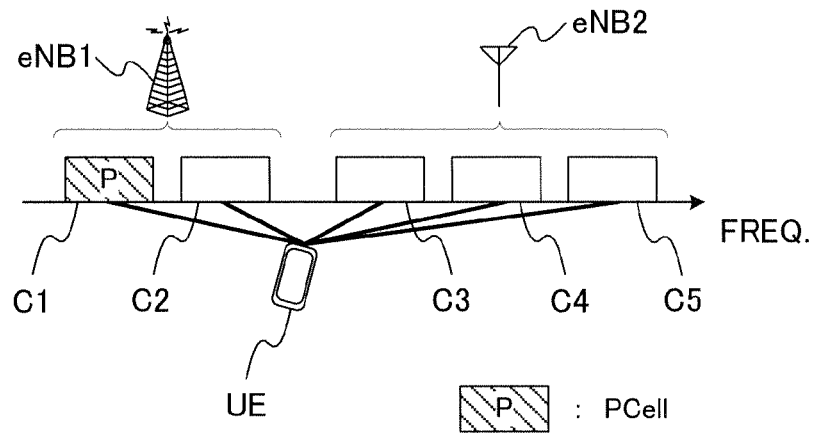
FIG. 2 contains diagrams showing one example of cell configurations in carrier aggregation and dual connectivity.

FIG. 2A illustrates communication between a radio base station and a user terminal according to carrier aggregation. In the example shown in FIG. 2A, a radio base station eNB1 is a radio base station (hereinafter, referred to as macro base station) for forming a macro cell, and a radio base station eNB2 is a radio base station (hereinafter, referred to as small base station) for forming a small cell. For example, the small base station may have a configuration of RRH (Remote Radio Head) that connects to the macro base station.

In the case of applying carrier aggregation, one scheduler (e.g. scheduler that the macro station eNB1 has) controls scheduling of a plurality of cells. In the configuration where the scheduler that the macro base station eNB1 has controls scheduling of a plurality of cells, for example, it is expected that radio base stations are mutually connected by ideal backhaul such as a high-speed line like an optical fiber.

Figure 2B:
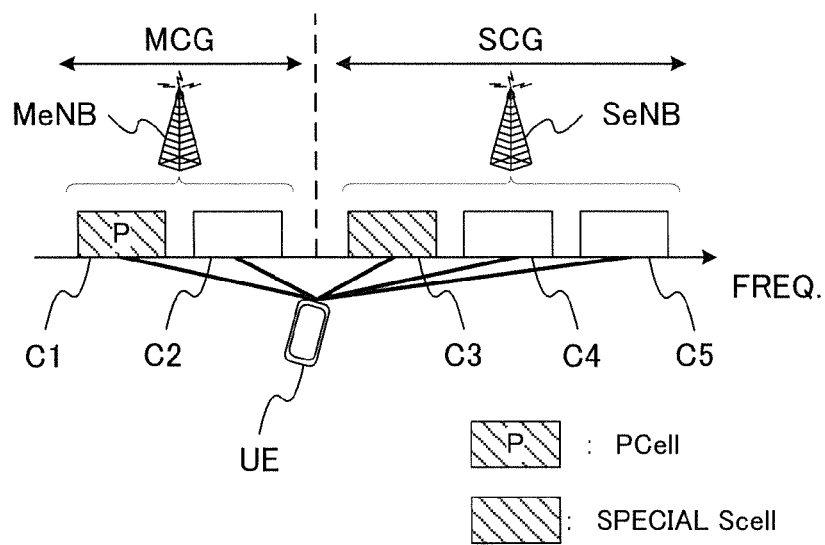

FIG. 2B illustrates communication between a radio base station and a user terminal according to dual connectivity. In the case of applying dual connectivity, a plurality of schedulers is provided independently, and the plurality of schedulers (e.g. a scheduler that a radio base station MeNB has and a scheduler that a radio base station SeNB has) controls scheduling of one or more cells respectively under the control thereof. In the configuration where the scheduler that the radio base station MeNB has and the scheduler that the radio base station SeNB has control scheduling of one or more cells respectively under the control thereof, for example, it is expected that radio base stations are mutually connected by non-ideal backhaul such as X2 interface where delay is not ignored.

As shown in FIG. 2B, in dual connectivity, each radio base station sets a cell group (CG) comprised of one or a plurality of cells. Each cell group is comprised of one or more cells that the same radio base station forms, or one or more cells that the same transmission point such as a transmission antenna apparatus and transmission station forms.

The cell group including the PCell is called the master cell group (MCG), and the cell group except the master cell group is called the secondary cell group (SCG). The total number of cells constituting the MCG and SCG is set at the predetermined number (e.g. "5") or less.

The radio base station set for the MCG (communicates using the MCG) is called the master base station (MeNB: Master eNB), and the radio base station set for the SCG (communicates using the SCG) is called the secondary base station (SeNB: Secondary eNB).

In dual connectivity, tight coordination equal to carrier aggregation is not the premise between radio base stations. Therefore, the user terminal performs downlink L1/L2 control (PDCCH/EPDCCH) and uplink L1/L2 control (UCI (Uplink Control Information) feedback by PUCCH/PUSCH) for each cell group independently. Accordingly, the SeNB also requires a specific SCell having functions (e.g. common search space, PUCCH and the like) equal to the PCell. The specific SCell having the functions equal to the PCell is also referred to as "PSCell", "primary SCell" and the like.

Figure 3:
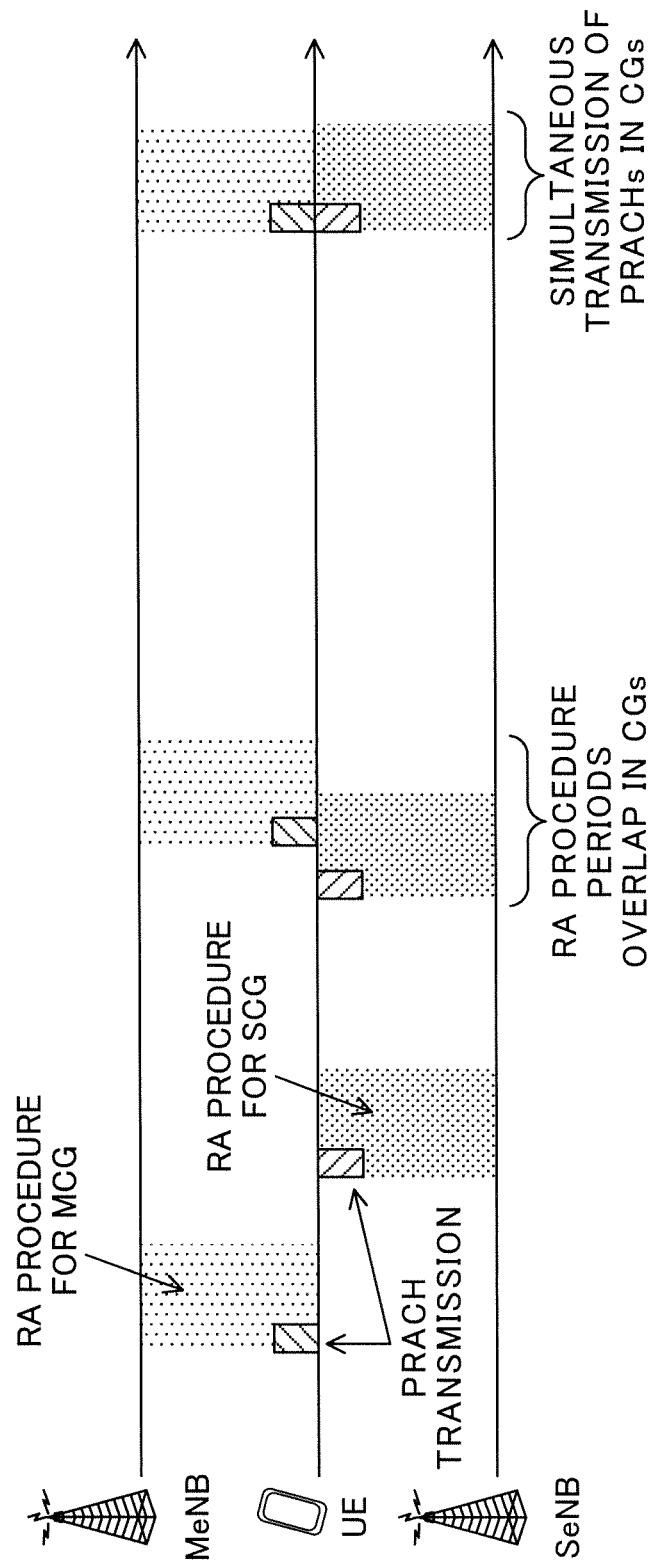
FIG. 3 is a diagram to explain random access of dual connectivity.

In dual connectivity, each of the MCG and SCG supports random access. FIG. 3 is a diagram to explain random access of dual connectivity. As shown in FIG. 3, each of the MCG and SCG is provided with a random access procedure period. In these periods, the user terminal UE transmits the PRACH.

In the MCG, the PCell supports both contention-based random access and non-contention-based random access, and the SCell of sTAG (secondary Timing Advance Group) supports only non-contention-based random access. In the SCG, the PSCell supports both contention-based random access and non-contention-based random access, and the SCell of sTAG supports only non-contention-based random access.

The random access may be performed parallel in the MCG and SCG unless the state is power-limited. For example, as shown in FIG. 3, cell groups may have overlapping random access procedure periods. Further, as shown in FIG. 3, the PRACH may be transmitted simultaneously from cell groups. Furthermore, when the PRACH is simultaneously transmitted from cell groups, a period of the simultaneous transmission is also called a simultaneous transmission period.

Herein, the power-limited means a state reaching maximum transmission power from the viewpoint of at least one of the serving cell, the TAG, the cell group and the UE at timing at which the user terminal transmits. For example, the power-limited refers to that transmission power of an uplink signal is limited as a result of a request of transmission of uplink signals exceeding allowable maximum transmission power of the user terminal. In other words, the power-limited refers to that the sum of transmission power required for uplink signals to the MeNB (MCG) and uplink signals to the SeNB (SCG) exceeds allowable maximum transmission power of the user terminal. Herein, required transmission power (also referred to as desired power, desired transmission power, and the like) includes required power (required transmission power) notified from the radio base station and transmission power increased by applying power-ramping based on the required power.

In dual connectivity, since the master base station MeNB and secondary base station SeNB perform scheduling independently, it is difficult to perform transmit power control for dynamically adjusting transmission power in a range in which total transmission power of the user terminal to the master base station MeNB and secondary base station SeNB does not exceed allowable maximum transmission power. When required total transmission power (also referred to as total transmission power, the sum of transmission power and the like) exceeds allowable maximum transmission power of the user terminal, the user terminal performs scaling down on power (Power-scaling) or processing (also referred to as dropping, drop and the like) of dropping a part or the whole of a channel or signal until total transmission power is a value that does not exceed allowable maximum transmission power. In addition, dropping may be actualized by setting power at "0".

In dual connectivity, since each of the master base station MeNB and secondary base station SeNB does not grasp power control performed by the radio base station (SeNB for MeNB, MeNB for SeNB) as a pair, there is the risk that timing and frequency at which such power-scaling and dropping occurs is not expected. When unexpected power-scaling and dropping is performed for the master base station MeNB and secondary base station SeNB, it is not possible to correctly perform uplink communication, and there is the risk that the communication quality and throughput extremely deteriorates.

Then, in dual connectivity, the concept of "minimum guaranteed power" for each cell group is introduced to at least PUCCH/PUSCH transmission. It is assumed that minimum guaranteed power of the MCG is $P_{MeNB}$, and that minimum guaranteed power of the SCG is $P_{SeNB}$. The master base station MeNB or secondary base station SeNB notifies the user terminal of both or one of minimum guaranteed power $P_{MeNB}$ and $P_{SeNB}$ by higher layer signaling (e.g. RRC signaling). When signaling or instruction is particularly not given, the user terminal is capable of recognizing that minimum guaranteed power $P_{MeNB}=0$ and/or $P_{SeNB}=0$.

In the case where a transmission request is made from the master base station MeNB i.e. in the case where transmission of PUCCH/PUSCH is triggered by an uplink grant or RRC signaling, the user terminal calculates transmission power to the MCG, and when required power is minimum guaranteed power $P_{MeNB}$ or less, determines the required power as transmission power to the MCG.

In the case where a transmission request is made from the secondary base station SeNB i.e. in the case where transmission of PUCCH/PUSCH is triggered by an uplink grant or RRC signaling, the user terminal calculates transmission power to the SCG, and when required power is minimum guaranteed power $P_{SeNB}$ or less, determines the required power as transmission power to the SCG.

When required power of the radio base station xeNB (master base station MeNB or secondary base station SeNB) exceeds minimum guaranteed power $P_{xeNB}$ (minimum guaranteed power $P_{MeNB}$ or $P_{SeNB}$), the user terminal sometimes controls so that transmission power is minimum guaranteed power $P_{xeNB}$ or less, depending on the condition. Specifically, when there is the risk that total required power of the MCG and SCG exceeds allowable maximum transmission power $P_{CMAX}$ of the user terminal, the user terminal performs power-scaling or dropping on a part of a channel or signal for the cell group that requires power exceeding minimum guaranteed power $P_{xeNB}$. As a result, when transmission power becomes minimum guaranteed power $P_{xeNB}$ or less, the user terminal does not perform power-scaling and dropping more than the aforementioned processing.

In other words, as maximum transmission power of PUCCH/PUSCH in dual connectivity, at least minimum guaranteed power $P_{MeNB}$ or $P_{SeNB}$ is guaranteed. In addition, being dependent on allocation of another cell group, instruments of the user terminal and the like, there is a case that minimum guaranteed power $P_{MeNB}$ or $P_{SeNB}$ is not guaranteed as maximum transmission power of PUCCH/PUSCH.

In the example shown in FIG. 4A, power less than minimum guaranteed power $P_{MeNB}$ is required from the master base station MeNB, and power exceeding minimum guaranteed power $P_{SeNB}$ is required from the secondary base station SeNB. The user terminal checks whether the total sum of transmission power for each CC does not exceed minimum guaranteed power $P_{MeNB}$ and $P_{SeNB}$, and whether the total sum of transmission power of all CCs in both cell groups does not exceed allowable maximum transmission power $P_{CMAX}$, for each of the MCG and SCG.

In the example as shown in FIG. 4A, since the total sum of transmission power of all CCs in both cell groups exceeds allowable maximum transmission power $P_{CMAX}$, the user terminal applies power-scaling or dropping. Since the total sum of transmission power for each CC of the MCG does not exceed minimum guaranteed power $P_{MeNB}$, but the total sum of transmission power for each CC of the SCG exceeds minimum guaranteed power $P_{SeNB}$, the user terminal allocates the required power to the MCG as transmission power, and further allocates remaining power (surplus power obtained by subtracting transmission power of the MCG from allowable maximum transmission power $P_{CMAX}$) to the SCG. For the SCG, the user terminal regards the remaining power as allowable maximum transmission power, and applies power-scaling or dropping to the SCG.

In the example shown in FIG. 4B, the master base station MeNB requires power exceeding minimum guaranteed power $P_{MeNB}$, and the secondary base station SeNB requires power of minimum guaranteed power $P_{SeNB}$ or less. The total sum of transmission power of all CCs in both cell groups exceeds allowable maximum transmission power $P_{CMAX}$, and therefore, the user terminal applies power-scaling or dropping.

In the example shown in FIG. 4B, since the total sum of transmission power for each CC of the SCG does not exceed minimum guaranteed power $P_{SeNB}$, but the total sum of transmission power for each CC of the MCG exceeds minimum guaranteed power $P_{MeNB}$, the user terminal allocates the required power to the SCG as transmission power, and further allocates remaining power (surplus power obtained by subtracting transmission power of the SCG from allowable maximum transmission power $P_{CMAX}$) to the MCG. For the MCG, the user terminal regards the remaining power as allowable maximum transmission power, and applies power-scaling or dropping to the MCG.

As rules of power-scaling and dropping, it is also possible to apply the rules specified in Rel-10/11. In Rel-10/11, simultaneous transmission in a plurality of CCs may occur in CA, and therefore, the rules of power-scaling and dropping are specified in the case where required transmission power of all CCs exceeds allowable maximum transmission power $P_{CMAX}$ per user terminal. When the remaining power (surplus power obtained by subtracting transmission power of the MCG from allowable maximum transmission power $P_{CMAX}$) is regarded as allowable maximum transmission power, and transmission power required in the cell group is regarded as required transmission power, it is possible to perform power-scaling and dropping using the rules specified in Rel-10/11 for the cell group. Since it is possible to actualize these manners by the already specified schemes, without introducing a new scheme as the rules of transmit power control, power-scaling and dropping, the user terminal is capable of achieving with ease by diversion of the existing schemes.

In the LTE-A system, since the PRACH is used in initial connection, synchronization establishment, communication resume, and the like, it is important to perform transmission/reception of the PRACH with high quality. In non-dual connectivity (Non-DC), maximum transmission power of the PRACH is maximum transmission power $P_{CMAX,c}$ per CC. Further, when carrier aggregation is applied, in the case where the PRACH is transmitted simultaneously with the PUCCH, PUSCH or SRS (Sounding Reference Signal), it is specified that transmission power is allocated to the PRACH as the first priority. Further, in the case of simultaneously transmitting the PRACH and PUCCH/PUSCH, when transmission power exceeds allowable maximum transmission power $P_{CMAX}$, transmission power of PUCCH/PUSCH is subjected to power-scaling until actual transmission power becomes a value that does not exceed $P_{CMAX}$. Further, in the case of simultaneously transmitting the PRACH and SRS, when transmission power exceeds allowable maximum transmission power $P_{CMAX}$, the SRS is dropped so that actual transmission power does not exceed $P_{CMAX}$.

In this way, in non-dual connectivity, two or more PRACHs are not simultaneously transmitted, and the highest priority is given to power allocation of the PRACH. However, in the radio communication system using dual connectivity, there is a case that the PRACH is simultaneously transmitted in a plurality of CGs. In this case, it has not been specified how to determine maximum transmission power of the PRACH of each CG. Further, a priority rule that transmission power allocation is preferentially given to which CG has not been specified. Therefore, when transmission power of the PRACH is not set properly, there is the risk that throughput of the system deteriorates.

Then, the inventors of the present invention noted that when a radio link failure (RLF) occurs in the MeNB (or PCell), re-connection of the cell is required and that throughput of the system particularly deteriorates. Further, the inventors of the present invention noted that the possibility of the RLF in the MeNB (or PCell) is high when power of the PRACH transmitted to the MeNB (or PCell) lacks. Based on the above-mentioned viewpoints, the inventors of the present invention conceived that transmission power is preferentially allocated to the PRACH transmitted to the MeNB (or PCell) in a simultaneous transmission period of the PRACH in the radio communication system using dual connectivity. Further, for power-ramping in PRACH retransmission, the inventors also conceived that power control is preferentially performed on the MeNB (or PCell), and arrived at the present invention.

According to the present invention, it is possible to reduce the occurrence of the RLF in the MeNB or PCell, and therefore, it is possible to suppress delay by cell re-connection. As a result, it is possible to suppress decrease in throughput of the system.

Embodiments of the present invention will be described in detail below with reference to accompanying drawings. In addition, in the following description, the case will be described as an example where a single MCG and a single SCG are set, and a higher priority is given to power control of the PRACH to the MCG (MeNB) than the PRACH to the SCG (SeNB), but this Embodiment is not limited thereto.
(Power Control in PRACH Simultaneous Transmission)

When the power-limited occurs by PRACH simultaneous transmission between different CGs (when the UE detects the power-limited by PRACH simultaneous transmission), by applying one of the following Embodiments (Embodiments 1 to 3), it is controlled so that the total (total transmission power) of transmission power of all CGs does not exceed $P_{CMAX}$ in all simultaneous transmission periods.

In Embodiment 1, the PRACH of the SCG is subjected to power-scaling. In other words, transmission power of the PRACH of the MCG is determined as in Rel-11 and given, and as transmission power of the PRACH of the SCG, power obtained by subtracting transmission power of the PRACH of the MCG from $P_{CMAX}$ is given.

In Embodiment 2, the PRACHs of both CGs are subjected to power-scaling. For example, a coefficient W meeting the following equation 1 is obtained, and using W, the PRACHs of both CGs are subjected to power-scaling. In other words, transmission of the PRACH of the MCG and transmission power of the PRACH of the SCG is reduced at the same rate.

[Mathematics 1]

$$W \times P_{MCG\_PRACH} + W \times P_{SCG\_PRACH} \leq P_{CMAX} \quad \text{(Equation 1)}$$

Herein, $P_{MCG\_PRACH}$ is desired power of the PRACH of the MCG, and $P_{SCG\_PRACH}$ is desired power of the PRACH of the SCG.

Alternatively, the PRACHs of both CGs are subjected to power-scaling to two predetermined values ($P_{pre\_MCG\_PRACH}$, $P_{pre\_SCG\_PRACH}$) beforehand set so as to meet the following equation 2. These two predetermined values ($P_{pre\_MCG\_PRACH}$, $P_{pre\_SCG\_PRACH}$) may be beforehand specified, or may be notified to the user terminal by system information block and higher layer signaling such as RRC.

[Mathematics 2]

$$P_{pre\_MCG\_PRACH} + P_{pre\_SCG\_PRACH} \leq P_{CMAX} \quad \text{(Equation 2)}$$

In Embodiment 3, the PRACH of the SCG is dropped. In this case, the UE does not transmit the PRACH of the SCG. In addition, power allocation of MCG PRACH may be performed as in the same manner up to Rel-11, or may be performed based on a different policy.

As described above, in each Embodiment, the higher priority is given to MCG PRACH than SCG PRACH, and control is performed to allocate at least power equal to or more than SCG PRACH.
(Power-Ramping of the PRACH of Each CG)

Figure 7:
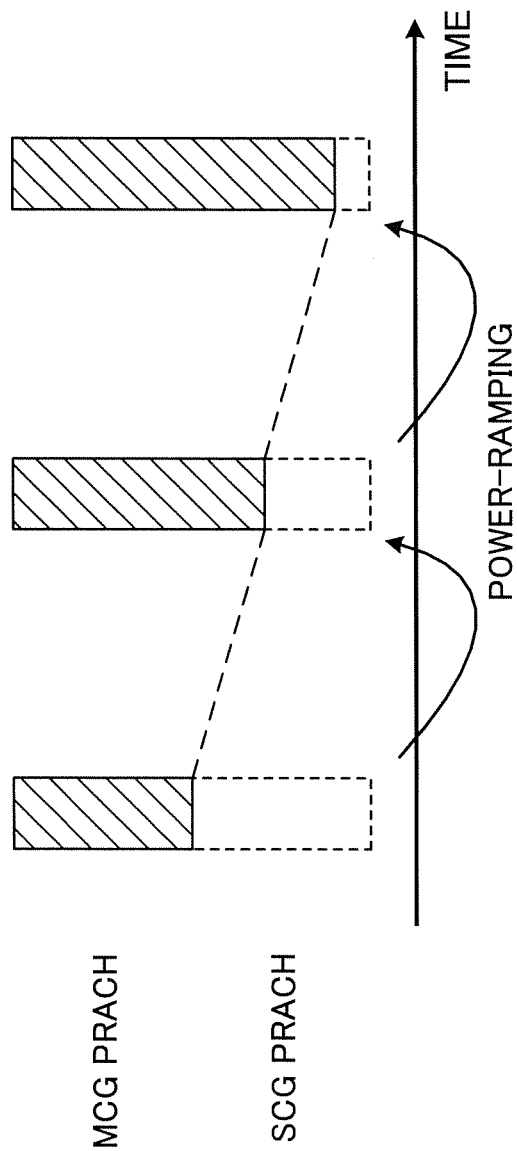
FIG. 7 is a diagram to explain one example of power-ramping of PRACH in Embodiment 3.

Next, for each Embodiment, referring to FIGS. 5 to 7, the case will be described where the UE is not able to receive the RAR (Msg2) within a predetermined time, after the UE transmits the PRACH (Msg1). In this case, the UE performs power-ramping of the PRACH to retransmit. FIGS. 5 to 7 are diagrams to explain one example of power-ramping of the PRACH in Embodiments 1 to 3, respectively. Each diagram shows the example of performing retransmission twice (performing a transmission attempt three times).

In Embodiment 1, power-ramping of the PRACH of the MCG is performed in the same manner as in transmitting the PRACH of the MCG alone. On the other hand, power-ramping of the PRACH of the SCG is limited, in consideration of the PRACH of the MCG (e.g. power-ramping is not performed until retransmission of the PRACH of the MCG is finished.)

In Embodiment 2, since the power-limited already occurs by both PRACHs, it is not possible to perform power-ramping. In other words, for both the PRACH of the MCG and the PRACH of the SCG, the PRACH is retransmitted with the same power (without power-ramping) as in transmission the last time.

In Embodiment 3 (the case of dropping the PRACH of the SCG), as in Embodiment 1, power-ramping of the PRACH of the MCG is performed in the same manner as in transmitting the PRACH of the MCG alone. On the other hand, the PRACH of the SCG is not transmitted until retransmission of the PRACH of the MCG is finished.

As described above, according to Embodiment power allocation/power-ramping of MCG PRACH is performed in the same manner up to Rel-11, and it is thereby possible to properly maintain coverage of MCG PRACH. Further, according to Embodiment 2, since it is possible to maintain power of SCG PRACH to some extent, it is possible to increase the random access success probability in the SCG and reduce connection delay to the SCG.

Further, according to Embodiment 3, power allocation/power-ramping of MCG PRACH is performed in the same manner up to Rel-11, and it is thereby possible to properly maintain MCG PRACH coverage. Further, it is possible to avoid useless sending (useless transmission) of the PRACH due to improper power (e.g. too low power) in the SCG, and to suppress increase in power consumption.

Figure 8:
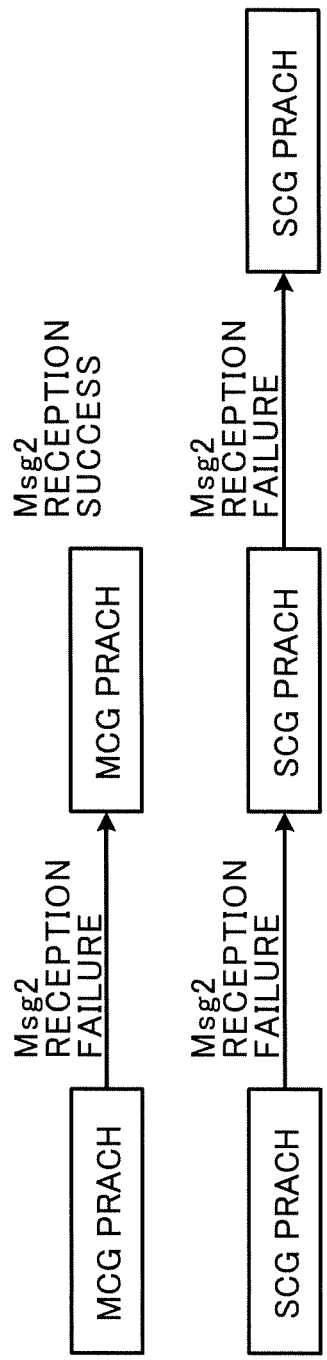
FIG. 8 is a diagram showing one example of retransmission of PRACH in each Embodiment.

In addition, in any of the Embodiments, as soon as Msg2 reception succeeds in one of CGs, the other CG is capable of performing PRACH retransmission by proper power-ramping. FIG. 8 is a diagram showing one example of retransmission of the PRACH in each Embodiment. In this example, for first PRACH transmission of both CGs, reception of Msg2 fails in both CGs. For second PRACH transmission of both CGs, the MCG succeeds in receiving the Msg2, and the SCG fails to receive the Msg2. Then, SCG performs third PRACH transmission.

According to the above-mentioned Embodiments, in the case of simultaneous transmission of the MCG and SCG in retransmission, since the SCG is not able to perform power-ramping, it is not possible to apply power-ramping to the second PRACH transmission of the SCG in FIG. 8. On the other hand, since the third PRACH transmission of the SCG is single transmission of the SCG, it is possible to apply power-ramping.
(Ramp-Up Amount in Power-Ramping of the PRACH of Each CG)

Described next is a ramp-up amount in power-ramping of the PRACH according to each Embodiment. The ramp-up amount refers to an increment in desired power with initial transmission power (e.g. required power from the radio base station) as a reference. Specifically, a ramp-up amount calculated by the following equation 3 is applied.

Ramp-up amount=(the number of RAR reception failure times−the number of PRACH attempt times that is power-limited in simultaneous transmission)×Ramping Step (Equation 3)

Herein, the Ramping Step represents an increment in the ramp-up amount when the number of RAR reception failure times increases by "1". In addition, the number of RAR reception failure times in equation 3 may be replaced with the number of PRACH attempt times, the number of PRACH retransmission times, the number of PRACH attempt times −1, or the like. In addition, the number of PRACH attempt times is also referred to as the number of PRACH transmission times. Further, it is assumed that the above-mentioned equation is used in power-ramping to apply to the SCG, but the invention is not limited thereto. For example, power-ramping may be performed in the MCG by applying equation 3.

In addition, the ramp-up amount in power-ramping of the PRACH is not limited to equation 3. For example, the ramp-up amount may be calculated using another function based on the number of RAR reception failure times and the number of PRACH transmission times that is power-limited in simultaneous transmission, a reference table and the like.

According to equation 3, the ramp-up amount is determined based on the number of single transmission attempt times of the PRACH. Therefore, when simultaneous transmission of the PRACH is finished and single transmission is performed, it is possible to prevent the PRACH from being transmitted with power more than necessary and thereby prevent excessive interference from being imposed on another cell.

The example in the case of applying equation 3 to the above-mentioned Embodiments will specifically be described with reference to FIGS. 9 and 10. FIGS. 9 and 10 are diagrams to explain one example of the ramp-up amount by power-ramping of the PRACH in Embodiments 1 and 3. FIG. 9A and FIG. 10A correspond to Embodiment 1, and FIG. 9B and FIG. 10A correspond to Embodiment 3.

Further, each diagram shows the example of attempting SCG PRACH transmission four times. The second and third attempts of SCG PRACH are simultaneous transmission with MCG PRACH. Accordingly, in the second and third attempts of SCG PRACH, desired power is increased based on the ramp-up, but since the MCG PRACH is also ramped up, as a result, transmission power of SCG PRACH is lower than desired power.

A ramp-up amount of the fourth attempt of SCG PRACH in the case of using the above-mentioned equation 3 will be described below. In addition, unless otherwise specified, the number of RAR reception failure times is counted including a drop of the PRACH due to simultaneous transmission.

FIG. 9 contains diagrams showing one example when the ramp-up amount is calculated with equation 3 in Embodiments 1 and 3. In this example, the number of RAR reception failure times is "3", the number of PRACH attempt times that is power-limited in simultaneous transmission is "2", and therefore, the ramp-up amount is 1× Ramping Step.

In addition, it is possible to achieve equation 3 also by not counting the PRACH that is power-limited by simultaneous transmission in the number of RAR reception failure times. FIG. 10 contains diagrams showing one example of the case of calculating the ramp-up amount using a Modification of equation 3 in Embodiments 1 and 3. In this example, since the number of RAR reception failure times is "1", the ramp-up amount is 1× Ramping Step.

In addition, also in Embodiment 2, it is possible to determine the ramp-up amount using equation 3. For example, as shown in FIG. 6, in Embodiment 2, when PRACH simultaneous transmission is continued three times and the third MCG PRACH succeeds, in the fourth attempt of SCG PRACH, for the SCG PRACH, using equation 3, it is possible to apply 0× Ramping Step as the ramp-up amount.

(Operation of PHY Layer and MAC Layer)

Figure 11:
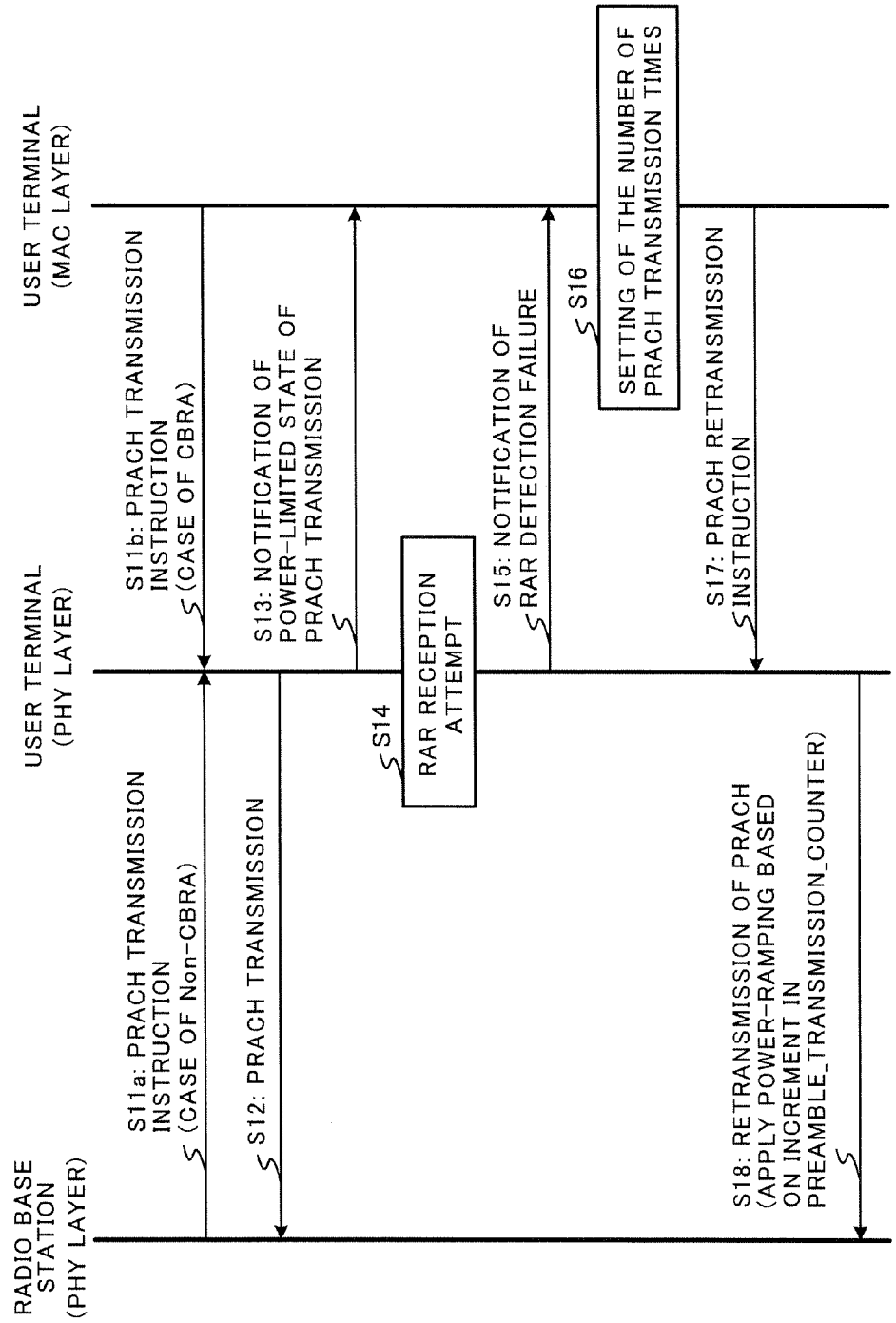
FIG. 11 is a diagram showing one example of a sequence of PRACH retransmission control to which is applied power-ramping based on the number of RAR reception failure times and the number of PRACH transmission times that is power-limited in simultaneous transmission.

With respect to power-ramping of the PRACH according to the present invention, described is specific processing performed in the PHY layer and MAC layer. FIG. 11 is a diagram showing one example of a sequence of PRACH retransmission control to which is applied power-ramping based on the number of RAR reception failure times and the number of PRACH transmission times that is power-limited in simultaneous transmission. In the following description, when "MAC layer" is simply described, "MAC layer" indicates "MAC layer of the user terminal".

First, a predetermined event trigger to transmit the PRACH occurs in the PHY layer of the user terminal. Specifically, in the case of Non-CBRA, the PHY layer (PDCCH reception) of the radio base station is a trigger (step S11a), and in the case of CBRA, the MAC layer is a trigger (step S11b). The user terminal transmits the PRACH based on one of the above-mentioned triggers (step S12).

When the PRACH transmission is not transmitted (dropping, power-scaling, partial loss and the like) with desired quality (e.g. desired transmission power) due to transmission of a different signal (e.g. PRACH transmission with a higher priority), the PHY layer of the user terminal reports notification (e.g. notification that the PRACH transmission is power-limited and is normally not transmitted) on the power-limited state of the PRACH to the MAC layer (step S13). When the above-mentioned PRACH transmission is not power-limited, the notification of step S13 is not performed.

On the other hand, the PHY layer of the user terminal attempts to receive the RAR corresponding to the PRACH transmitted from the terminal for a predetermined period (RAR window) after transmitting the PRACH (step S14).

When reception of the RAR does not succeed (reception fails), the PHY layer of the user terminal notifies the MAC layer of the RAR detection failure (RAR reception failure) (step S15). Judging that reception of the RAR does not succeed is the following cases, for example: (1) any RAR is not received for a predetermined period (RAR window) at all; and (2) an identifier (e.g. RA-RNTI (Random Access Radio Network Temporary Identifier)) of an RA preamble corresponding to the transmitted PRACH (RA preamble) is not received in any of RARs. In addition, the judgement that reception of the RAR does not succeed is not limited thereto.

Further, in step S15, instead of notifying of the RAR detection failure, the PHY layer of the user terminal may notify the MAC layer of an RAR detection report when reception of the RAR succeeds.

Next, by notification of the RAR detection failure from the PHY layer, the MAC layer recognizes the RAR detection failure, and performs setting of the number of PRACH transmission times for retransmission (step S16). In addition, the MAC layer may recognize the RAR detection failure, by not receiving the RAR detection report from the PHY layer.

When the RAR is not received within the predetermined time in the PHY layer, and the MAC layer does not receive notification (notification of the power-limited state) that the PRACH transmission is power-limited and is not normally transmitted from the PHY layer, the MAC layer adds "1" to the number of PRACH transmission times (PREAMBLE_TRANSMISSION_COUNTER) (increments by "1").

On the other hand, when the RAR is not received within the predetermined time in the PHY layer, and the MAC layer receives notification of the power-limited state from the PHY layer, the MAC layer does not add "1" to the number of PRACH transmission times (PREAMBLE_TRANSMISSION_COUNTER) (does not change).

As can be seen from the foregoing, in this Embodiment, the PREAMBLE_TRANSMISSION_COUNTER corresponds to (the number of RAR reception failure times–the number of PRACH attempt times that is power-limited in simultaneous transmission) of equation 3. In addition, an initial value of the PREAMBLE_TRANSMISSION_COUNTER may be "0".

Next, when the PREAMBLE_TRANSMISSION_SOUNTER does not reach a predetermined threshold (e.g. preambleTransMax)+1, the MAC layer instructs the PHY layer to retransmit the PRACH (step S17). In addition, when the PREAMBLE_TRANSMISSION_COUNTER reaches the predetermined threshold+1, the MAC layer may further notify of the higher layer of the problem of random access, or may judge that the random access procedure fails.

Herein, the MAC layer determines transmission power of the PRACH transmitted again, by applying power-ramping based on the PREAMBLE_TRANSMISSION_COUNTER. For example, the MAC layer determines the ramp-up amount based on equation 3, and indicates the rank-up amount (or power-ramping amount) to the PHY layer.

Further, the MAC layer determines transmission timing of the PRACH transmitted again as described below to indicate to the PHY layer. In the case of Non-CBRA, the MAC layer determines a first PRACH resource after a lapse of predetermined time (e.g. 4 ms) since the last subframe of the RAR reception-capable period as the transmission timing. This is equivalent to the case where a backoff parameter value is set at a predetermined value (e.g. initial value (0)).

Further, in the case of CBRA, the MAC layer determines a PRACH resource after a lapse of backoff since the last subframe of the RAR reception-capable period as the transmission timing. The backoff parameter value of this case is a predetermined value (e.g. initial value (0)), a value indicated by the RAR (e.g. value designated in the field of the backoff indicator) or a value that the user terminal UE autonomously selects between "0" and the value indicated by the RAR (in addition, as a probability, a random value uniformly distributed between "0" and the value indicated by the RAR).

When the PHY layer of the user terminal receives a PRACH retransmission instruction from the MAC layer, the PHY layer retransmits the PRACH of step S12 (step S18). Herein, the PHY layer eventually determines transmission power of the PRACH (the PHY layer also determines application of power-scaling and the like.) In addition, when the PHY layer does not receive the RAR, the PHY layer makes preparations so as to perform next PRACH transmission after a lapse of predetermined time (e.g. 4 ms) since the predetermined transmission period of the RAR.

In addition, in the example of FIG. 11, it is assumed that the notification (information) on the power-limited state of step S13 is notification that PRACH transmission is power-limited and is normally not transmitted, but the notification is not limited thereto. For example, the notification on the power-limited state may be notification that PRACH transmission is not power-limited and is normally transmitted. In this case, in step S16, when the RAR is not received within the predetermined time in the PHY layer, and the MAC layer receives notification that the PRACH transmission is not power-limited and is normally transmitted from the PHY layer, the MAC layer may add "1" to the number of PRACH transmission times (PREAMBLE_TRANSMISSION_COUNTER).

Figure 12:
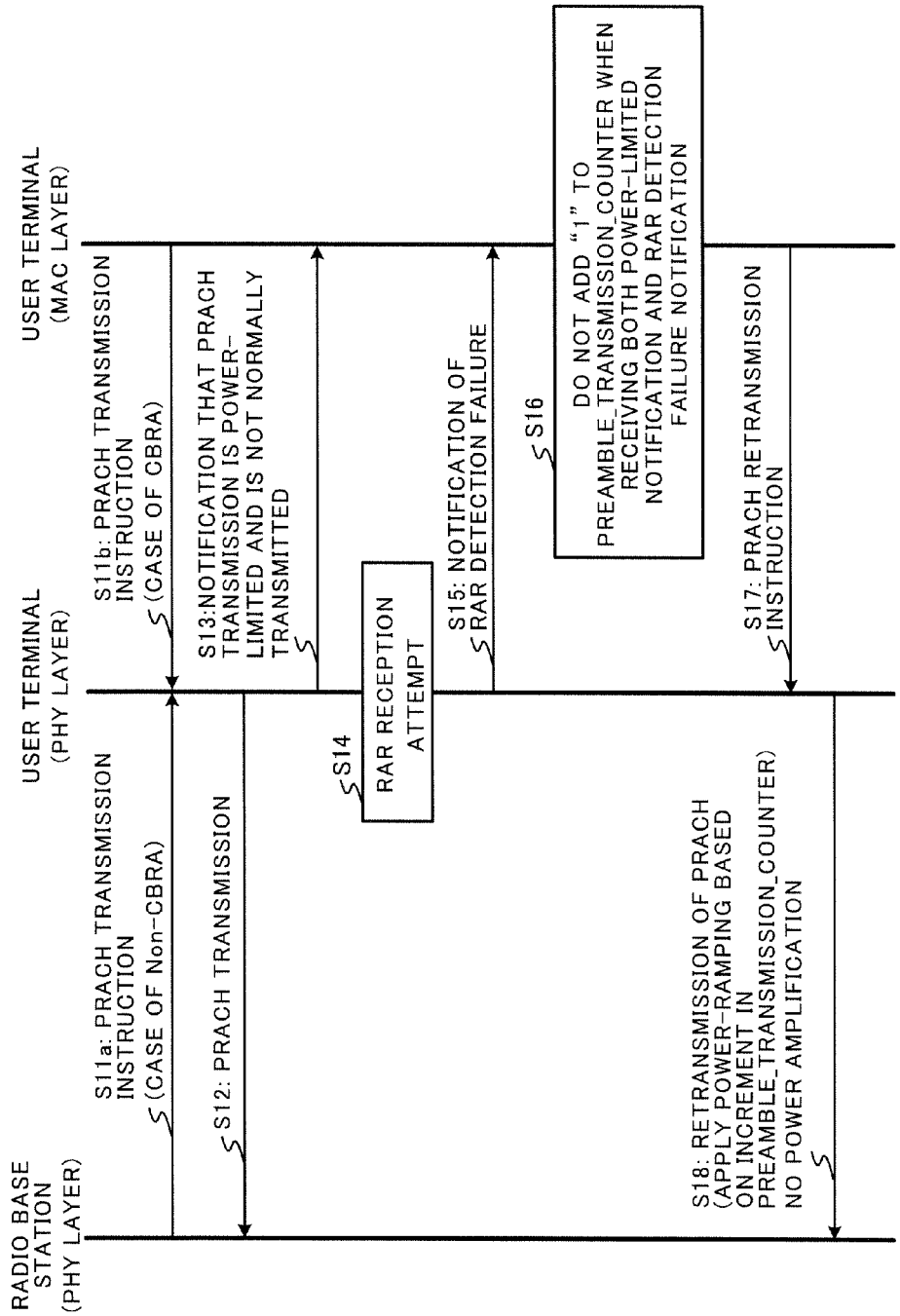
FIG. 12 is a diagram showing one example of an actual sequence expected in FIG. 11.
Figure 13:
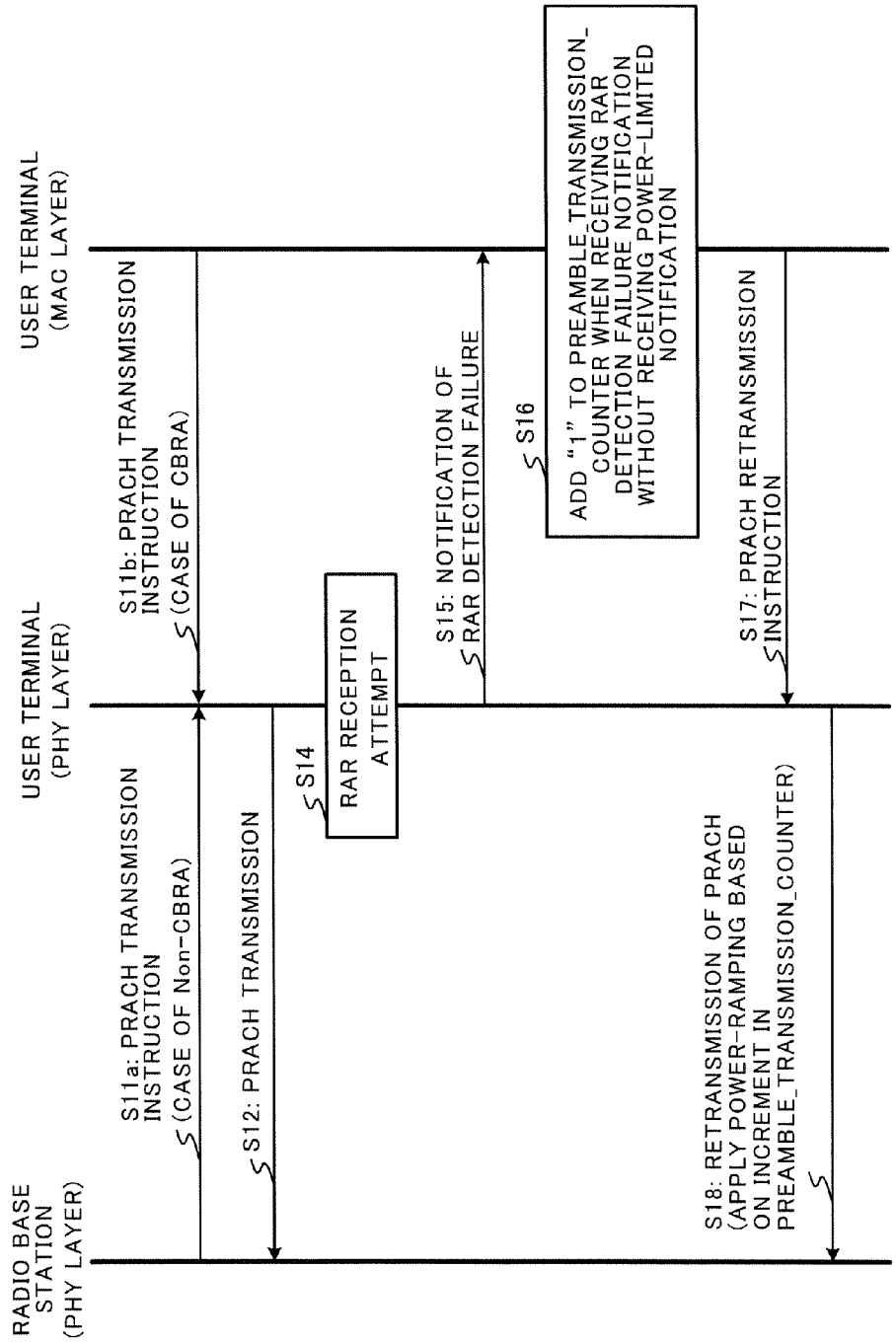
FIG. 13 is diagram showing one different example of the actual sequence expected in FIG. 11.

FIGS. 12 and 13 are diagrams showing one example of actually expected sequences in the sequence shown in FIG. 11. FIGS. 12 and 13 are the same as the case of FIG. 11 except steps S13 and S16 to S18. A difference occurs between FIGS. 12 and 13 by the presence or absence of step S13.

In FIG. 12, in step S13, the PHY layer of the user terminal notifies the MAC layer that PRACH transmission is the power-limited state. Further, in step S15, the RAR detection failure is notified. In this case, in step S16, since the MAC layer receives both the power-limited notification and the RAR failure notification, the MAC layer does not add "1" to the PREAMBLE_TRANSMISSION_COUNTER. Accordingly, the ramp-up amount notified to the PHY layer in step S17 is not changed either (is the same as the ramp-up amount applied to the last PRACH transmission/retransmission). As a result, in step S18, in consideration of the same power as in the last PRACH transmission/retransmission, PRACH retransmission is performed.

On the other hand, in FIG. 13, PRACH transmission of step S12 is not the power-limited state, and notification of step S13 is not performed. In step S15, the RAR detection failure is notified. In this case, in step S16, since the power-limited notification is not received and the RAR detection failure notification is received, the MAC layer adds "1" to the PREAMBLE_TRANSMISSION_COUNTER. Accordingly, a ramp-up amount notified to the PHY layer in step S17 is increased, as compared with the last PRACH transmission/retransmission. As a result, in step S18, PRACH retransmission is performed, in consideration of power subjected to power-ramping.

Thus, according to one Embodiment of the present invention, the PHY layer and MAC layer of the user terminal operate in cooperation with each other, and therefore, also in the radio communication system using dual connectivity, it is possible to perform suitable PRACH retransmission control. Particularly, the PHY layer notifies the MAC layer of the information on a power-limited state of the PRACH, which has not been used in the conventional LTE system at all, and the MAC layer is thereby capable of performing retransmission power control in consideration of the power-limited state to instruct the PHY layer.

In addition, in each of the Embodiments as described above, in the case of simultaneous transmission of MCG PRACH and SCG PRACH, a higher priority is given to MCG PRACH, but the present invention is not limited thereto. For example, in the case of giving a higher priority to SCG PRACH, power-ramping in FIG. 11 may be applied to MCG PRACH.

Further, for example, instead of MCG PRACH, the highest priority may be given to PCell PRACH than the other all cells. In this case, in each of the above-mentioned Embodiments, it is possible to replace MCG PRACH with PCell PRACH, and SCG PRACH with another PRACH (e.g. SCG PRACH) to read. Furthermore, in power-ramping in simultaneous transmission, after PCell PRACH succeeds, for example, the above-mentioned another PRACH may be subjected to ramping with a ramp-up amount in equation 3.

(Configuration of a Radio Communication System)

A configuration of a radio communication system according to one Embodiment of the present invention will be described below. In the radio communication system is applied a radio communication method of performing PRACH transmit power control according to each of the above-mentioned Embodiments.

Figure 14:
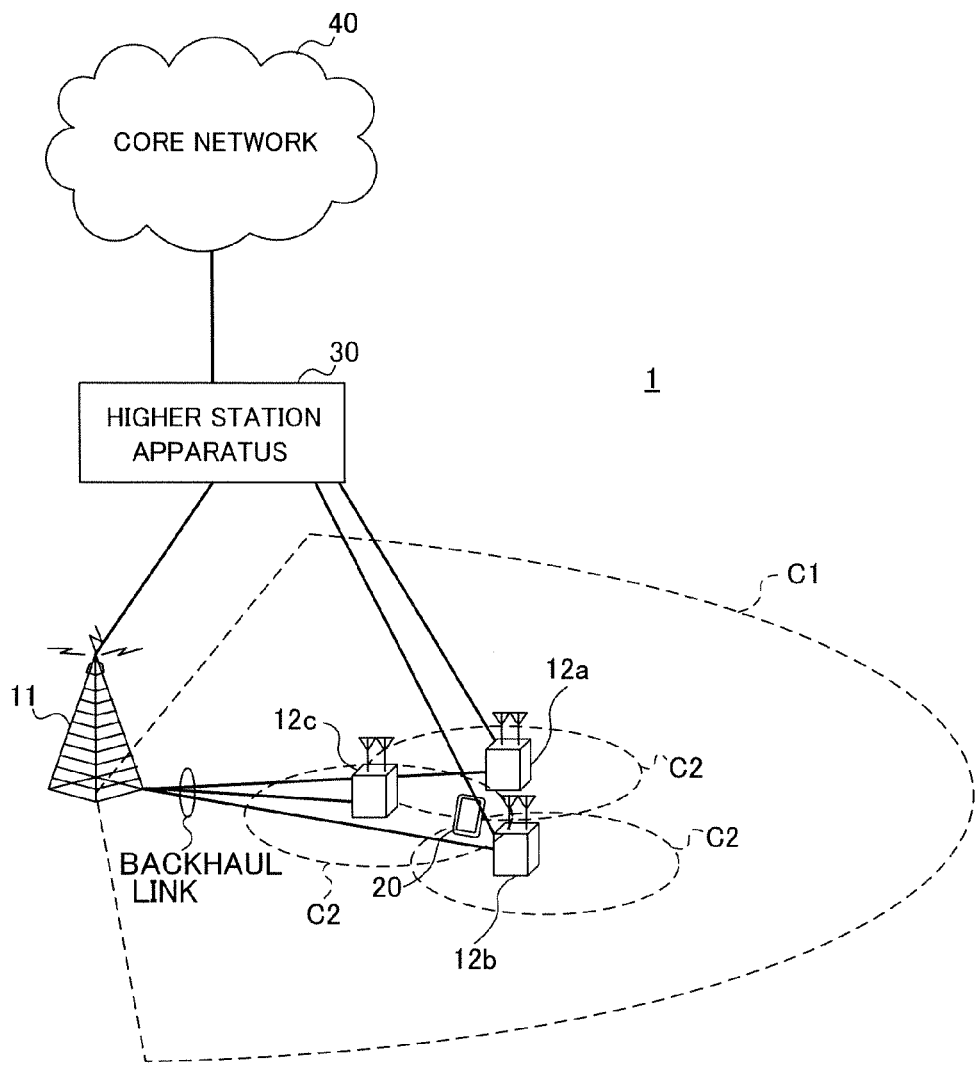
FIG. 14 is a diagram showing one example of a schematic configuration of a radio communication system according to one Embodiment of the present invention.

FIG. 14 is a schematic configuration diagram showing one example of the radio communication system according to one Embodiment of the present invention. As shown in FIG. 14, the radio communication system 1 is provided with a plurality of radio base stations 10 (11 and 12), and a plurality of user terminals 20 which is present inside a cell formed by each radio base station 10 and is configured to be able to communicate with each radio base station 10. Each of the radio base stations 10 is connected to a higher station apparatus 30, and is connected to a core network 40 via the higher station apparatus 30.

In FIG. 14, for example, the radio base station 11 is comprised of a macro base station having relatively wide coverage, and forms a macro cell C1. Each of the radio base stations 12 is comprised of a small base station having local coverage, and forms a small cell C2. In addition, the numbers of the radio base stations 11 and 12 are not limited to the numbers shown in FIG. 14.

In the macro cell C1 and small cell C2, the same frequency band may be used, or different frequency bands may be used. Further, the radio base stations 11 and 12 are mutually connected via an inter-base station interface (e.g. optical fiber, X2 interface).

In addition, the macro base station 11 may be called a radio base station, eNodeB (eNB), transmission point, and the like. The small base station 12 may be called a pico-base station, femto-base station, Home eNodeB (HeNB), transmission point, RRH (Remote Radio Head), and the like.

The user terminal 20 is a terminal supporting various communication schemes such as LTE and LTE-A, and may include a fixed communication terminal, as well as the mobile communication terminal. The user terminal 20 is capable of executing communications with another user terminal 20 via the radio base station 10.

For example, the higher station apparatus 30 includes an access gateway apparatus, Radio Network Controller (RNC), Mobility Management Entity (MME) and the like, but is not limited thereto.

In the radio communication system, as radio access schemes, OFDMA (Orthogonal Frequency Division Multiple Access) is applied on downlink, and SC-FDMA (Single Carrier-Frequency Division Multiple Access) is applied on uplink. OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of a single or contiguous resource blocks for each terminal so that a plurality of terminals uses mutually different bands, and thereby reducing interference among terminals. In addition, uplink and downlink radio access schemes are not limited to the combination of the schemes.

As downlink channels, in the radio communication system 1 are used a downlink shared channel (PDSCH: Physical Downlink Shared Channel) shared by user terminals 20, broadcast channel (PBCH: Physical Broadcast Channel), downlink L1/L2 control channels and the like. User data, higher layer control information and predetermined SIB (System Information Block) is transmitted on the PDSCH. Further, MIB (Master Information Block) is transmitted on the PBCH.

The downlink L1/L2 control channel includes the PDCCH (Physical Downlink Control Channel), EPDCCH (Enhanced Physical Downlink Control channel), PCFICH (Physical Control Format Indicator Channel), PHICH (Physical Hybrid-ARQ Indicator Channel) and the like. Downlink control information (DCI) including scheduling information of the PDSCH and PUSCH and the like is transmitted on the PDCCH. The number of OFDM symbols used in the PDCCH is transmitted on the PCFICH. A receipt confirmation signal (ACK/NACK) of HARQ for the PUSCH is transmitted on the PHICH. The EPDCCH may be frequency division multiplexed with the PDSCH (downlink shared data channel) to be used in transmitting the DCI and the like as the PDCCH.

As uplink channels, in the radio communication system 1 are used an uplink shared channel (PUSCH: Physical Uplink Shared Channel) shared by user terminals 20, uplink control channel (PUCCH: Physical Uplink Control Channel), random access channel (PRACH: Physical Random Access Channel) and the like. User data and higher layer control information is transmitted on the PUSCH. Further, radio quality information (CQI: Channel Quality Indicator) of downlink, receipt conformation signal and the like are transmitted on the PUCCH. A random access preamble (RA preamble) to establish connection with the cell is transmitted on the PRACH.

Figure 15:
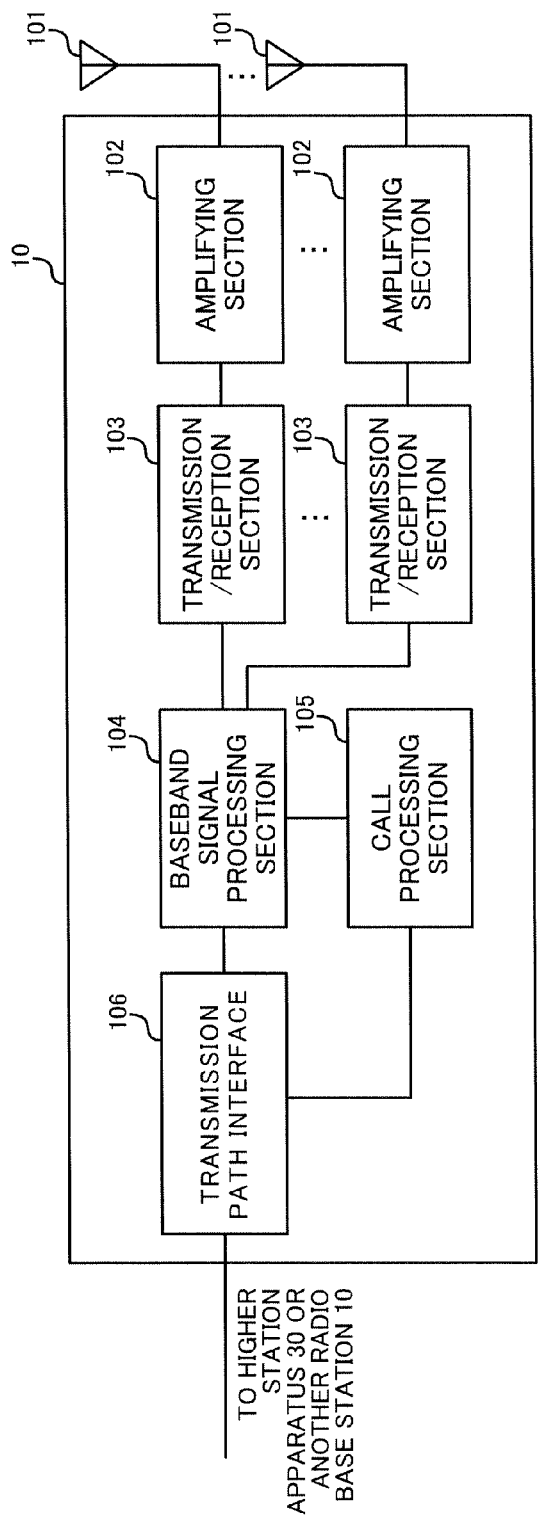
FIG. 15 is a diagram showing one example of an entire configuration of a radio base station according to one Embodiment of the invention.

FIG. 15 is an entire configuration diagram of the radio base station 10 according to one Embodiment of the present invention. The radio base station 10 (including the radio base stations 11 and 12) is comprised of a plurality of transmission/reception antennas 101 for MIMO transmission, amplifying sections 102, transmission/reception sections 103, baseband signal processing section 104, call processing section 105, and transmission path interface 106. In addition, the transmission/reception section 103 is comprised of a transmission section and a reception section.

User data to transmit to the user terminal 20 from the radio base station 10 on downlink is input to the baseband signal processing section 104 from the higher station apparatus 30 via the transmission path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g. transmission processing of HARQ (Hybrid Automatic Repeat reQuest)), scheduling, transmission format selection, channel coding, Inverse Fast Fourier Transform (IFFT) processing, and precoding processing to transfer to each of the transmission/reception sections 103. Further, also concerning a downlink control signal, the section 104 performs transmission processing such as channel coding and Inverse Fast Fourier Transform on the signal to transfer to each of the transmission/reception sections 103.

Each of the transmission/reception sections 103 converts a downlink signal, which is subjected to precoding for each antenna and is output from the baseband signal processing 104, into a signal with a radio frequency band to transmit. The radio-frequency signal subjected to frequency conversion in the transmission/reception section 103 is amplified in the amplifying section 102, and is transmitted from the transmission/reception antenna 101. The transmission/reception section 103 is capable of being a transmitter/receiver, transmission/reception circuit or transmission/reception apparatus explained based on common recognition in the technical field according to the present invention.

On the other hand, for uplink signals, a radio-frequency signal received in each of the transmission/reception antennas 101 is amplified in respective one of the amplifying sections 102. Each of the transmission/reception sections 103 receives the uplink signal amplified in the amplifying section 102. Each of the transmission/reception sections 103 performs frequency conversion on the received signal into a baseband signal to output to the baseband signal processing section 104.

For user data included in the input uplink signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the transmission path interface 106. The call processing section 105 performs call processing such as setting and release of a communication channel, state management of the radio base station 10, and management of radio resources.

The transmission path interface 106 transmits and receives signals to/from the higher station apparatus 30 via a predetermined interface. Further, the transmission path interface 106 may transmit and receive signals (backhaul signaling) to/from an adjacent radio base station via an inter-base station interface (e.g. optical fiber, X2 interface).

Figure 16:
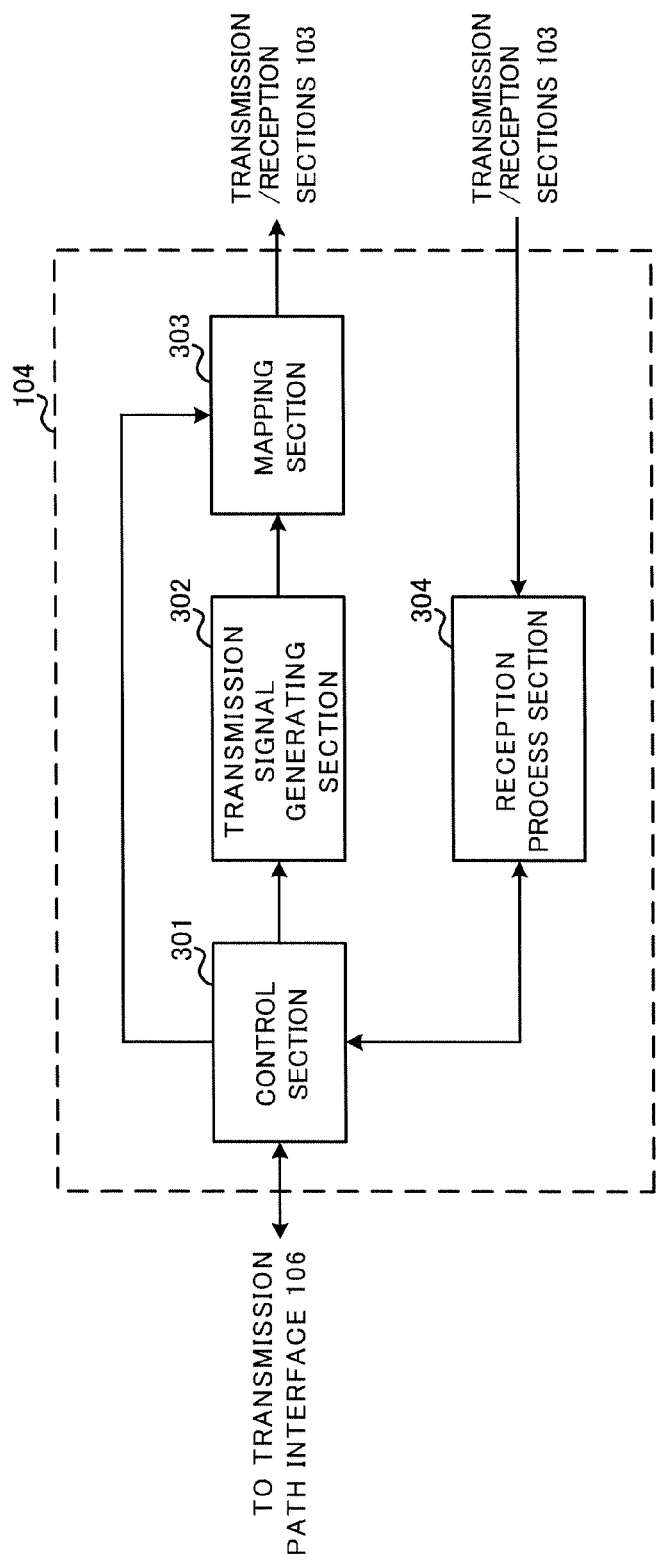
FIG. 16 is a diagram showing one example of a function configuration of the radio base station according to one Embodiment of the invention.

FIG. 16 is a main function configuration diagram of the baseband signal processing section 104 that the radio base station 10 has according to one Embodiment of the present invention. In addition, FIG. 16 mainly illustrates function blocks of a characteristic portion in this Embodiment, and the radio base station 10 is assumed to have other function blocks required for radio communication.

As shown in FIG. 16, the baseband signal processing section 104 that the radio base station 10 has includes at least a control section (scheduler) 301, transmission signal generating section 302, mapping section 303, and reception processing section 304 to be comprised thereof.

The control section (scheduler) 301 controls scheduling of a downlink data signal transmitted on the PDSCH and downlink control signal transmitted on the PDCCH and/or Enhanced PDCCH (EPDCCH). Further, the control section 301 also performs control of scheduling of system information, synchronization signal, CRS and downlink reference signal such as CSI-RS and the like. Furthermore, the control section controls scheduling of an uplink reference signal, uplink data signal transmitted on the PUSCH, uplink control signal transmitted on the PUCCH and/or the PUSCH, RA preamble transmitted on the PRACH and the like. The control section 301 is capable of being a controller, control circuit or control apparatus explained based on the common recognition in the technical field according to the present invention.

The control section 301 is capable of controlling the transmission signal generating section 302 and mapping section 303 so as to properly process a random access procedure of the user terminal 20. For example, the control section 301 is capable of controlling so as to transmit Msg0 to the user terminal 20. Further, the control section 301 is capable of controlling so as to transmit Msg2 with respect to the RA preamble.

Further, in order to adjust uplink signal transmission power of the user terminal 20 connecting to the radio base station 10, the control section 301 is capable of controlling the transmission signal generating section 302 and mapping section 303. Specifically, based on a PHR (Power Headroom Report) and channel state information (CSI) reported from the user terminal 20, error rate of uplink data, the number of HARQ retransmission times and the like, the control section 301 instructs the transmission signal generating section 302 to generate a transmit power control (TPC) command to control transmission power of an uplink signal, and is capable of controlling so that the mapping section 303 includes the TPC command in the downlink control information (DCI) to notify the user terminal 20. By this means, the radio base station 10 is capable of designating transmission power of an uplink signal to request the user terminal 20.

Based on instructions from the control section 301, the transmission signal generating section 302 generates DL signals (downlink control signal, downlink data signal, downlink reference signal and the like) to output to the mapping section 303. For example, based on instructions from the control section 301, the transmission signal generating section 302 generates a DL assignment for notifying of downlink signal assignment information and UL grant for notifying of uplink signal assignment information. Further, the downlink data signal is subjected to coding processing and modulation processing according to a coding rate, modulation scheme and the like determined based on the CSI from each user terminal 20 and the like. The transmission signal generating section 302 is capable of being a signal generator, signal generating circuit or signal generating apparatus explained based on the common recognition in the technical field according to the present invention.

Based on instructions from the control section 301, the mapping section 303 maps the downlink signal generated in the transmission signal generating section 302 to radio resources to output to the transmission/reception section 103. The mapping section 303 is capable of being a mapper, mapping circuit or mapping apparatus explained based on the common recognition in the technical field according to the present invention.

The reception processing section 304 performs reception processing (e.g. demapping, demodulation, decoding and the like) on the UL signal (uplink control signal, uplink data signal, uplink reference signal and the like) transmitted from the user terminal 20. Further, the reception processing section 304 may measure received power (e.g. RSRP (Reference Signal Received Power)), channel state and the like using the received signal. In addition, the processing result and measurement result may be output to the control section 301. The reception processing section 304 is capable of being a signal processor, signal processing circuit or signal processing apparatus explained based on the common recognition in the technical field according to the present invention.

Figure 17:
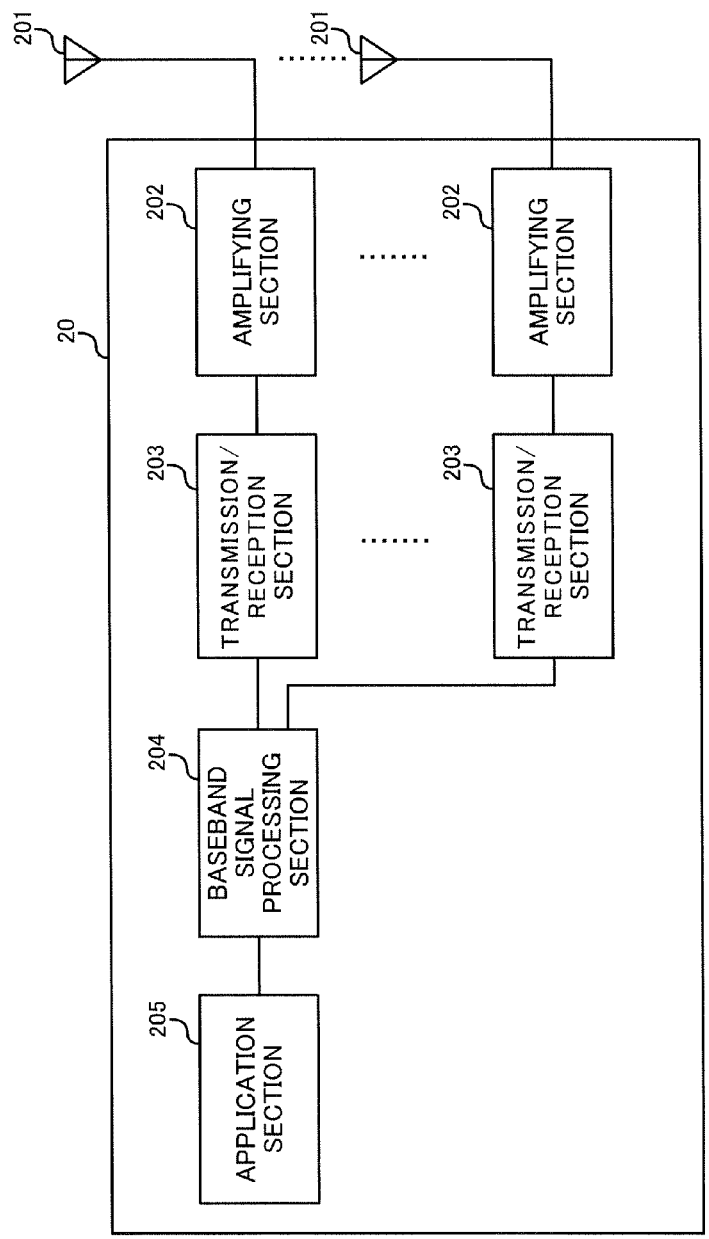
FIG. 17 is a diagram showing one example of an entire configuration of a user terminal according to one Embodiment of the invention.

FIG. 17 is an entire configuration diagram of the user terminal 20 according to one Embodiment of the present invention. As shown in FIG. 17, the user terminal 20 is provided with a plurality of transmission/reception antennas 201 for MIMO transmission, amplifying sections 202, transmission/reception sections 203, baseband signal processing section 204, and application section 205. In addition, the transmission/reception section 203 may be comprised of a transmission section and a reception section.

Radio-frequency signals received in a plurality of transmission/reception antennas 201 are respectively amplified in the amplifying sections 202. Each of the transmission/reception sections 203 receives the downlink signal amplified in the amplifying section 202. The transmission/reception section 203 performs frequency conversion on the received signal into a baseband signal to output to the baseband signal 204. The transmission/reception section 203 is capable of being a transmitter/receiver, transmission/reception circuit or transmission/reception apparatus explained based on the common recognition in the technical field according to the present invention.

The baseband signal processing section 204 performs FFT processing, error correcting decoding, reception processing of retransmission control and the like on the input baseband signal. User data on downlink is transferred to the application section 205. The application section 205 performs processing concerning layers higher than physical layer and MAC layer, and the like. Further, among the downlink data, broadcast information is also transferred to the application section 205.

On the other hand, for user data on uplink, the data is input to the baseband signal processing section 204 from the application section 205. The baseband signal processing section 204 performs transmission processing of retransmission control (e.g. transmission processing of HARQ), channel coding, precoding, Discrete Fourier Transform (DFT) processing, IFFT processing and the like to transfer to each of the transmission/reception sections 203. Each of the transmission/reception sections 203 converts the baseband signal output from the baseband signal processing section 204 into a signal with a radio frequency band. The radio-frequency signals subjected to frequency conversion in the transmission/reception sections 203 are amplified in the amplification sections 202, and transmitted from the transmission/reception antennas 201, respectively.

The transmission/reception section 203 is capable of transmitting and receiving signals to/from a plurality of radio base stations each of which sets a cell group (CG) comprised of one or more cells. For example, the transmission/reception section 203 is capable of simultaneously transmitting UL signals to a plurality of CGs.

Figure 18:
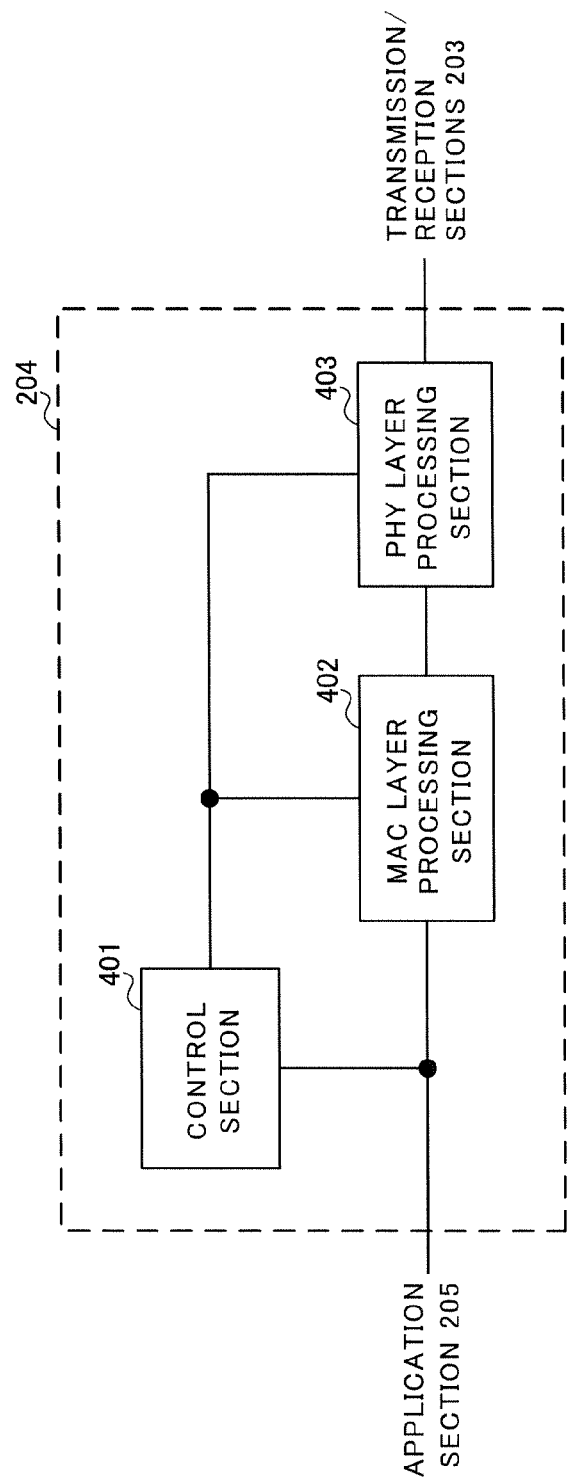
FIG. 18 is a diagram showing one example of a function configuration of the user terminal according to one Embodiment of the invention.

FIG. 18 is a main function configuration diagram of the baseband signal processing section 204 that the user terminal 20 has according to one Embodiment of the present invention. In addition, FIG. 18 mainly illustrates function blocks of a characteristic portion in this Embodiment, and the user terminal 20 is assumed to have other function blocks required for radio communication.

As shown in FIG. 18, the baseband signal processing section 204 that the user terminal 20 has includes at least a control section 401, MAC layer processing section 402 and PHY layer processing section 403 to be comprised thereof.

The control section 401 acquires the downlink control signal (signal transmitted on the PDCCH/EPDCCH) and downlink data signal (signal transmitted on the PDSCH), which are transmitted from the radio base station 10, from the MAC layer processing section 402. Based on the downlink control signal, a result of determining whether or not retransmission control is required for the downlink data signal and the like, the control section 401 controls generation of UL signals. Specifically, the control section 401 controls the MAC layer processing section 402 and PHY layer processing section 403. The control section 401 is capable of being a controller, control circuit or control apparatus explained based on the common recognition in the technical field according to the present invention.

The control section 401 includes a transmission signal generating section. Based on instructions from the control section 401, the transmission signal generating section generates a UL signal to output to the MAC layer processing section 402. For example, based on instructions from the control section 401, the transmission signal generating section generates an uplink control signal such as a receipt conformation signal (HARQ-ACK) and channel state information (CSI). Further, based on instructions from the control section 401, the transmission signal generating section generates an uplink data signal. For example, when a UL grant is included in the downlink control signal notified from the radio base station 10, the control section 401 instructs the transmission signal generating section to generate an uplink data signal. The transmission signal generating section 402 is capable of being a signal generator, signal generating circuit or signal generating apparatus explained based on the common recognition in the technical field according to the present invention.

The MAC layer processing section 402 performs processing of the MAC layer. Specifically, the downlink user data, broadcast information and the like input from the PHY layer processing section 403 is output to a higher layer processing section (not shown) that performs processing of the RLC layer, PDCP layer and the like through the processing of the MAC layer processing section 402. Further, the uplink user data and the like input from the application section 205 is input to the MAC layer processing section 402 through the processing of the higher layer processing section, and subsequently to the processing of the MAC layer, is further input to the PHY layer processing section 403.

The MAC layer processing section 402 controls retransmission of the UL signal. Specifically, when the transmission/reception section 203 simultaneously transmits the PRACH to the MCG and SCG, based on the power-limited state of SCG PRACH notified from the PHY layer processing section 403, the MAC layer processing section 402 controls power-ramping in retransmission of SCG PRACH. In addition, the MAC layer processing section 402 may determine the above-mentioned power-limited state by the presence or absence of notification on the power-limited state from the PHY layer processing section 403.

Herein, the MAC layer processing section 402 is capable of performing power-ramping control, based on the number of RAR reception failure times for the PRACH of the SCG. For example, based on the number of RAR reception failure times for the PRACH of the SCG and the power-limited state of transmitted SCG PRACH, the section may determine a ramp-up amount in retransmission to indicate to the PHY layer processing section 403. In calculation of the ramp-up amount, for example, the above-mentioned equation 3 may be used.

Further, after a lapse of predetermined period (e.g. time designated by the RAR window) since transmission of SCG PRACH, when the PHY layer processing section 403 does not receive the RAR to the PRACH and the MAC layer processing section 402 does not receive the notification on the power-limited state of the PRACH from the PHY layer processing section 403, the MAC layer processing section 402 may increment the above-mentioned number of RAR reception failure times by "1".

Furthermore, for the PRACH, as well as the ramp-up amount according to power-ramping, the MAC layer processing section 402 may indicate retransmission timing to the PHY layer processing section 403.

The PHY layer processing section 403 performs processing of the PHY layer. Specifically, the PHY layer processing section 403 includes a mapping section. Based on instructions from the control section 401, the mapping section maps the uplink signal input from the MAC layer processing section 402 to radio resources to output to the transmission/reception section 203. The mapping section is capable of being a mapper, mapping circuit or mapping apparatus explained based on the common recognition in the technical field according to the present invention.

Further, the PHY layer processing section 403 includes a reception processing section. The reception processing section performs reception processing (e.g. demapping, demodulation, decoding and the like) on the DL signal transmitted from the radio base station 10 to output to the MAC layer processing section 402. Further, the reception processing section may measure received power (RSRP) and channel state using the received signal. In addition, the processing result and measurement result may be output to the control section 401 via the MAC layer processing section 402. The reception processing section is capable of being a signal processor, signal processing circuit or signal processing apparatus explained based on the common recognition in the technical field according to the present invention.

The PHY layer processing section 403 controls transmission power of the UL signal. Specifically, when the transmission/reception section 203 simultaneously transmits the PRACH to the MCG and SCG, the control section 401 reduces transmission power of SCG PRACH to control so that the total of transmission power of each PRACH is allowable maximum transmission power ($P_{CMAX}$) or less (Embodiments 1 to 3). Herein, as well as transmission power of SCG PRACH, the section may control by reducing also transmission power of MCG PRACH (Embodiment 2). Further, the section may perform control for setting transmission power of SCG PRACH at "0" by dropping (Embodiment 3).

Further, based on instructions (for example, including a ramp-up amount of transmission power in PRACH retransmission) input from the MAC layer processing section 402, the PHY layer processing section 403 determines transmission power of the PRACH.

Furthermore, when the PHY layer processing section 403 does not receive the RAR to the PRACH for a predetermined period after transmission of the SCG PRACH, the section 403 may notify the MAC layer processing section 402 of the RAR reception failure.

In addition, the block diagram used in explanation of each of the above-mentioned Embodiments shows blocks on a function-by-function basis. These function blocks (configuration section) are actualized by any combination of hardware and software. Further, the means for actualizing each function block is not limited particularly. In other words, each function block may be actualized by a single physically combined apparatus, or two or more physically separated apparatuses are connected by cable or radio, and each function block may be actualized by a plurality of these apparatuses.

For example, a part or the whole of each of functions of the radio base station 10 and user terminal 20 may be actualized using hardware such as ASIC (Application Specific Integrated Circuit), PLD (Programmable Logic Device), and FPGA (Field Programmable Gate Array). Further, each of the radio base station 10 and user terminal 20 may be actualized by a computer apparatus including a processor (CPU), communication interface for network connection, memory, and computer-readable storage medium holding programs.

Herein, the processor, memory and the like are connected on the bus to communicate information. Further, for example, the computer-readable storage medium is a storage medium such as a flexible disk, magneto-optical disk, ROM, EPROM, CD-ROM, RAM and hard disk. Furthermore, the program may be transmitted from a network via an electrical communication line. Still furthermore, each of the radio base station 10 and user terminal 20 may include an input apparatus such as input keys and output apparatus such as a display.

The function configurations of the radio base station 10 and user terminal 20 may be actualized by the above-mentioned hardware, may be actualized by software modules executed by the processor, or may be actualized in combination of the hardware and software modules. The processor operates an operating system to control the entire user terminal. Further, the processor reads the program, software module and data from the storage medium on the memory, and according thereto, executes various kinds of processing. Herein, it is essential only that the program is a program for causing the computer to execute each operation described in each of the above-mentioned Embodiments. For example, the control section 401 of the user terminal 20 may be actualized by a control program stored in the memory to operate by the processor, and the other function blocks may be actualized similarly.

As described above, the present invention is specifically described, but it is obvious to a person skilled in the art that the invention is not limited to the Embodiments described in the present Description. For example, each of the above-mentioned Embodiments may be used alone or in combination. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The present application is based on Japanese Patent Application No. 2014-195459 filed on Sep. 25, 2014, entire content of which is expressly incorporated by reference herein.

The invention claimed is:

1. A user terminal that communicates using a plurality of Cell Groups (CGs) including a first CG and a second CG, comprising:
   a PHY layer processing section that controls transmission power of a PRACH (Physical Random Access Channel) in each CG; and
   a MAC layer processing section that controls retransmission of the PRACH,
   wherein when total transmission power of PRACHs of the plurality of CGs that are transmitted in an overlapping manner exceeds allowable maximum transmission power, the PHY layer processing section controls so as to preferentially allocate transmission power to the PRACH of the first CG, and
   based on notification which is reported from the PHY layer processing section when total transmission power of PRACHs of the plurality of CGs that are transmitted in an overlapping manner exceeds allowable maximum transmission power, the MAC layer processing section controls power-ramping in retransmission of the PRACH of the second CG.

2. The user terminal according to claim 1, wherein when total transmission power of PRACHs of the plurality of CGs that are transmitted in an overlapping manner exceeds allowable maximum transmission power, the PHY layer processing section performs power-scaling or dropping on transmission power of the PRACH of the second CG, and thereby controls so that the total transmission power does not exceed the allowable maximum transmission power.

3. The user terminal according to claim 2, wherein the MAC layer processing section controls power-ramping in retransmission of the PRACH of the second CG, based on the number of PRACH transmission times of the second CG.

4. The user terminal according to claim 3, wherein when any RAR (Random Access Response) is not received in an RAR window at all or an identifier corresponding to a transmitted RA (Random Access) preamble is not included in any of received RARs, and the notification is not received from the PHY layer processing section, the MAC layer processing section increments the number of PRACH transmission times of the second CG by "1".

5. The user terminal according to claim 4, wherein the PRACH of the first CG is transmitted from a PCell (Primary Cell).

6. The user terminal according to claim 3, wherein the PRACH of the first CG is transmitted from a PCell (Primary Cell).

7. The user terminal according to claim 2, wherein the PRACH of the first CG is transmitted from a PCell (Primary Cell).

8. The user terminal according to claim 1, wherein the MAC layer processing section controls power-ramping in retransmission of the PRACH of the second CG, based on the number of PRACH transmission times of the second CG.

9. The user terminal according to claim 8, wherein when any RAR (Random Access Response) is not received in an RAR window at all or an identifier corresponding to a transmitted RA (Random Access) preamble is not included in any of received RARs, and the notification is not received from the PHY layer processing section, the MAC layer processing section increments the number of PRACH transmission times of the second CG by "1".

10. The user terminal according to claim 9, wherein the PRACH of the first CG is transmitted from a PCell (Primary Cell).

11. The user terminal according to claim 8, wherein the PRACH of the first CG is transmitted from a PCell (Primary Cell).

12. The user terminal according to claim 1, wherein the PRACH of the first CG is transmitted from a PCell (Primary Cell).

13. A radio communication method of a user terminal that communicates using a plurality of Cell Groups (CGs) including a first CG and a second CG, including:
   a PHY layer processing step of controlling transmission power of a PRACH (Physical Random Access Channel) in each CG; and
   a MAC layer processing step of controlling retransmission of the PRACH,
   wherein when total transmission power of PRACHs of the plurality of CGs that are transmitted in an overlapping manner exceeds allowable maximum transmission power, the PHY layer processing step controls so as to preferentially allocate transmission power to the PRACH of the first CG, and
   based on notification which is reported from the PHY layer processing step when total transmission power of PRACHs of the plurality of CGs that are transmitted in an overlapping manner exceeds allowable maximum transmission power, the MAC layer processing step controls power-ramping in retransmission of the PRACH of the second CG.

14. A radio communication system including a user terminal that communicates using a plurality of Cell Groups (CGs) including a first CG and a second CG,
   wherein the user terminal has
   a PHY layer processing section that controls transmission power of a PRACH (Physical Random Access Channel) in each CG, and
   a MAC layer processing section that controls retransmission of the PRACH,
   wherein when total transmission power of PRACHs of the plurality of CGs that are transmitted in an overlapping manner exceeds allowable maximum transmission power, the PHY layer processing section controls so as to preferentially allocate transmission power to the PRACH of the first CG, and
   based on notification which is reported from the PHY layer processing section when total transmission power of PRACHs of the plurality of CGs that are transmitted in an overlapping manner exceeds allowable maximum transmission power, the MAC layer processing section controls power-ramping in retransmission of the PRACH of the second CG.

* * * * *